US009514697B2

(12) United States Patent
Maeda et al.

(10) Patent No.: US 9,514,697 B2
(45) Date of Patent: Dec. 6, 2016

(54) DISPLAY DEVICE AND DISPLAY METHOD

(71) Applicant: Sharp Kabushiki Kaisha, Osaka-shi, Osaka (JP)

(72) Inventors: Kazuhiro Maeda, Osaka (JP); Yousuke Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 21 days.

(21) Appl. No.: 14/410,597

(22) PCT Filed: May 22, 2013

(86) PCT No.: PCT/JP2013/064191

§ 371 (c)(1),
(2) Date: Dec. 23, 2014

(87) PCT Pub. No.: WO2014/010313

PCT Pub. Date: Jan. 16, 2014

(65) Prior Publication Data

US 2015/0145842 A1 May 28, 2015

(30) Foreign Application Priority Data

Jul. 9, 2012 (JP) ................................ 2012-153791

(51) Int. Cl.
*G06F 3/038* (2013.01)
*G09G 5/00* (2006.01)
(Continued)

(52) U.S. Cl.
CPC .......... *G09G 3/3659* (2013.01); *G09G 3/2092* (2013.01); *G09G 3/3233* (2013.01); *G09G 3/3688* (2013.01); *G09G 3/2096* (2013.01); *G09G 3/3291* (2013.01);
(Continued)

(58) Field of Classification Search
CPC ............. G09G 3/3614; G09G 3/3648; G09G 2300/0842; G09G 3/3233
See application file for complete search history.

(56) References Cited

U.S. PATENT DOCUMENTS

2002/0093473 A1 7/2002 Tanaka et al.
2005/0219188 A1* 10/2005 Kawabe ................ G09G 3/342 345/94

(Continued)

FOREIGN PATENT DOCUMENTS

JP 2002-278523 A 9/2002
JP 2005-265869 A 9/2005
JP 2007-033584 A 2/2007
JP 2008-151986 A 7/2008
JP 2010-113050 A 5/2010

OTHER PUBLICATIONS

Official Communication issued in International Patent Application No. PCT/JP2013/064191, mailed on Jun. 25, 2013.

*Primary Examiner* — Alexander Eisen
*Assistant Examiner* — Nan-Ying Yang
(74) *Attorney, Agent, or Firm* — Keating & Bennett, LLP

(57) ABSTRACT

When there are a plurality of rows with the same display content, a scanning order calculating portion (23) provided in a display control circuit (200) determines addresses sequentially such that scanning signal lines corresponding to the rows are selected at the same time. A scanning order setting portion (24) controls an address output portion (26) such that the scanning signal lines are selected in such an order, and also controls digital image signals DV outputted by output frame memory (22). In this case, the number of changes in potential for video signal lines can be reduced by the number of rows selected at the same time, resulting in reduced power consumption for driving the video signal lines.

13 Claims, 13 Drawing Sheets

(51) Int. Cl.

| | |
|---|---|
| ***G09G 5/10*** | (2006.01) |
| ***G09G 3/36*** | (2006.01) |
| ***G09G 3/20*** | (2006.01) |
| ***G09G 3/32*** | (2016.01) |

(52) U.S. Cl.

CPC ............... *G09G 2310/0205* (2013.01); *G09G 2310/027* (2013.01); *G09G 2310/0213* (2013.01); *G09G 2310/0227* (2013.01); *G09G 2310/04* (2013.01); *G09G 2310/06* (2013.01); *G09G 2330/023* (2013.01); *G09G 2370/08* (2013.01)

(56) References Cited

U.S. PATENT DOCUMENTS

| | | | | |
|---|---|---|---|---|
| 2006/0238552 | A1* | 10/2006 | Chuang .................. | G09G 5/006 345/690 |
| 2010/0097367 | A1* | 4/2010 | Kitayama ................ | G09G 3/36 345/213 |
| 2010/0110065 | A1* | 5/2010 | Abe ..................... | G09G 3/3216 345/213 |

* cited by examiner

| GL | GRAYSCALE VALUE | SELECTION ORDER |
|---|---|---|
| GL(1) | 240 | 1 |
| GL(2) | 164 | 2 |
| GL(3) | 240 | 1 |
| GL(4) | 32 | 3 |
| GL(5) | 128 | 4 |
| GL(6) | 240 | 1 |

| GL | GRAYSCALE VALUE | SELECTION ORDER |
|---|---|---|
| GL(1) | 240 | 1 |
| GL(2) | 164 | 3 |
| GL(3) | 240 | 1 |
| GL(4) | 32 | 4 |
| GL(5) | 128 | 5 |
| GL(6) | 240 | 2 |

| GL | GRAYSCALE VALUE | SELECTION ORDER |
|---|---|---|
| GL(1) | 240 | 1 |
| GL(2) | 164 | 2 |
| GL(3) | 240 | 1 |
| GL(4) | 32 | 3 |
| GL(5) | 128 | 4 |
| GL(6) | 240 | 1 |
| GL(7) | 128 | 4 |

| GL | GRAYSCALE VALUE | SELECTION ORDER |
|---|---|---|
| GL(1) | 240 | 1 |
| GL(2) | 164 | 2 |
| GL(3) | 240 | 1 |
| GL(4) | 32 | 4 |
| GL(5) | 128 | 3 |
| GL(6) | 240 | 1 |

| GL | SL(1) | INPUT DATA | DETERMINATION DATA | SELECTION ORDER |
|---|---|---|---|---|
| GL(1) | V11 | 111010 | 111 | 1 |
| GL(2) | V21 | 001110 | 001 | 4 |
| GL(3) | V31 | 010111 | 010 | 3 |
| GL(4) | V41 | 110111 | 110 | 2 |

DISPLAY DEVICE AND DISPLAY METHOD

TECHNICAL FIELD

The present invention relates to display devices, more specifically to an active-matrix display device and a display method in which scanning is performed in a different manner from sequential scanning.

BACKGROUND ART

Recent liquid crystal display devices have higher definition screens and therefore have increased numbers of video signal lines and scanning signal lines. Accordingly, more power is required for driving these signal lines. In addition, each scanning signal line is selected for a shorter period of time, and therefore, there is difficulty in setting a pause period in which no scanning signal lines are selected during one frame period. As a result, there is also difficulty in reducing power consumption by setting such a pause period.

Therefore, Japanese Laid-Open Patent Publication No. 2005-265869 discloses the configuration of a liquid crystal display device in which reset signals are provided only to scanning signal lines through which pixel forming portions corresponding to pixels whose display states change from their immediately preceding display states (during the immediately preceding frame period) are selected. In this configuration, no reset signal is provided to any pixel whose display state remains unchanged, resulting in reduced power consumption.

CITATION LIST

Patent Document

Patent Document 1: Japanese Laid-Open Patent Publication No. 2005-265869

SUMMARY OF THE INVENTION

Problems to be Solved by the Invention

Here, in Japanese Laid-Open Patent Publication No. 2005-265869, for any pixel whose display state does not change during two consecutive frame periods, specifically, there is no change in the voltage applied to the pixel forming portion for displaying that pixel. However, normal liquid crystal display devices are driven such that the polarity of the voltage applied to the pixel forming portion is inverted at least on a frame-by-frame basis, and therefore, power consumption can be reduced only in a limited case where the voltage applied to the pixel forming portion remains unchanged before and after polarity inversion. Accordingly, the above conventional configuration is not exactly capable of reducing overall power consumption sufficiently.

Therefore, an objective of the present invention is to provide a display device and method capable of reducing power consumption focusing on changes in voltages applied to pixel forming portions during one frame period in which to display an image.

Solution to the Problems

A first aspect of the present invention is directed to a display device for displaying an image by means of a plurality of pixel forming portions arranged along a plurality of video signal lines for transmitting a plurality of video signals and a plurality of scanning signal lines crossing the video signal lines, the device comprising:

a video signal line drive circuit for driving the video signal lines on the basis of image signals representing the image;

a scanning order determining circuit for determining the order of selecting the scanning signal lines on the basis of the image signals, such that at least two scanning signal lines being equal at each of the video signal lines in terms of a potential applied to the video signal line are selected at the same time; and a scanning signal line drive circuit for selectively driving the scanning signal lines in accordance with the order determined by the scanning order determining circuit.

In a second aspect of the present invention, based on the first aspect of the invention, when the number of scanning signal lines being equal at each of the video signal lines in terms of the potential applied to the video signal line exceeds a predetermined threshold, the scanning order determining circuit determines the order of selecting the scanning signal lines such that the same number of scanning signal lines as the threshold are selected at the same time.

In a third aspect of the present invention, based on the second aspect of the invention, when the number of scanning signal lines being equal at each of the video signal lines in terms of the potential applied to the video signal line exceeds a predetermined threshold, the scanning order determining circuit determines the order of selecting the scanning signal lines such that the same number of scanning signal lines as the threshold are selected at the same time, and up to the same number of unselected remaining scanning signal lines as the threshold are selected at the same time at an immediately succeeding place within the order.

In a fourth aspect of the present invention, based on the first aspect of the invention, the scanning order determining circuit determines the order of selecting the scanning signal lines such that the scanning signal lines being equal at each of the video signal lines in terms of the potential applied to the video signal line are selected at the same time, and the scanning order determining circuit sets a selection period for the scanning signal lines to be selected at the same time such that the selection period lasts longer as the number of scanning signal lines to be selected at the same time increases, and the selection period corresponding to the scanning signal lines to be selected at the same time is longer than a period in which one scanning signal line is selected.

In a fifth aspect of the present invention, based on the first aspect of the invention, the scanning order determining circuit determines at least a part of the order so as to minimize an integrated value obtained by adding up absolute values of respective amounts of change in potential for at least a part of the video signal lines due to switching among the scanning signal lines to be selected by the scanning signal line drive circuit.

In a sixth aspect of the present invention, based on the fifth aspect of the invention, the scanning order determining circuit determines the next scanning signal line to be selected to minimize the integrated value obtained by adding up the absolute values of the amounts of change in potential, and also determines a scanning signal line to be selected immediately thereafter to minimize the integrated value obtained by adding up the absolute values of the amounts of change in potential.

In a seventh aspect of the present invention, based on the fifth aspect of the invention, the scanning order determining circuit calculates the integrated value on the basis of a predetermined number of upper bits of digital grayscale data included in the image signals and specifying potentials to be applied to the video signal lines.

In an eighth aspect of the present invention, based on the fifth aspect of the invention, the scanning order determining circuit adds up absolute values of respective amounts of change in potential for every predetermined number of video signal lines from among all of the video signal lines, the predetermined number being an integer multiple of two or more.

In a ninth aspect of the present invention, based on the fifth aspect of the invention, once the order is determined, the scanning order determining circuit keeps the determined order until a change in the image is detected.

In a tenth aspect of the present invention, based on the first aspect of the invention, the scanning signal line drive circuit includes an address decoder, and the scanning order determining circuit provides the address decoder with addresses in accordance with the order.

In an eleventh aspect of the present invention, based on the tenth aspect of the invention, the scanning signal line drive circuit further includes a state register for receiving a signal outputted by the address decoder and, when a predetermined control signal is active, outputting a signal to select a corresponding scanning signal line, and the scanning order determining circuit provides the control signal to the state register.

In a twelfth aspect of the present invention, based on the tenth aspect of the invention, the scanning signal line drive circuit further includes: a first state register for receiving a signal outputted by the address decoder and, when a predetermined first control signal is active, outputting a signal in accordance with a state of the signal outputted by the address decoder; and a second state register for receiving the signal outputted by the first state register and, when a predetermined second control signal is active, outputting a signal in accordance with a state of the signal outputted by the first state register in order to select a corresponding scanning signal line, and the scanning order determining circuit provides the first control signal to the first state register and the second control signal to the second state register, the second control signal being at least active during a period in which the address decoder is provided with the addresses.

In a thirteenth aspect of the present invention, based on the first aspect of the invention, the scanning signal line drive circuit selects the scanning signal lines in the order determined by the scanning order determining circuit, and thereafter stops or pauses its operation for a period until the next image is displayed.

In a fourteenth aspect of the present invention, based on the thirteenth aspect of the invention, the video signal line drive circuit stops or pauses its operation during the period in which the scanning signal line drive circuit stops or pauses its operation.

A fifteenth aspect of the present invention is directed to a method for displaying an image on a plurality of pixel forming portions arranged along a plurality of video signal lines for transmitting a plurality of video signals and a plurality of scanning signal lines crossing the video signal lines, the method comprising:

a video signal line drive step of driving the video signal lines on the basis of image signals representing the image;

a scanning order determining step of determining the order of selecting the scanning signal lines on the basis of the image signals, such that at least two scanning signal lines being equal at each of the video signal lines in terms of a potential applied to the video signal line are selected at the same time; and a scanning signal line drive step of selectively driving the scanning signal lines in accordance with the order determined in the scanning order determining step.

Effect of the Invention

In the first aspect of the present invention, the order of selecting the scanning signal lines is determined such that at least two scanning signal lines being equal at each of the video signal lines in terms of a potential applied to the video signal line are selected at the same time, and therefore, the number of changes in potential for the video signal lines decreases compared to the case where the scanning signal lines are selected one by one in order of arrangement, resulting in a reduced total amount of change in potential. Thus, power consumption for driving the video signal lines can be reduced.

In the second aspect of the present invention, when the number of scanning signal lines being equal at each of the video signal lines in terms of the potential applied thereto exceeds a predetermined threshold, the order of selection is determined such that the same number of scanning signal lines as the threshold are selected at the same time, and therefore, the number of simultaneously selectable rows is limited. Thus, the drive capability of the video signal line drive circuit can be inhibited from being surpassed, thereby preventing display quality from being reduced.

In the third aspect of the present invention, the order of selection is determined such that at an immediately succeeding place within the order after the same number of scanning signal lines as the threshold have been selected at the same time, up to the same number of unselected remaining scanning signal lines as the threshold are selected at the same time, whereby the drive capability of the video signal line drive circuit can be inhibited from being surpassed, and further, the scanning signal lines selected at the immediately succeeding place within the order are equal at each of the video signal lines in terms of the potential applied to the video signal line, so that changes in potential for the video signal lines occur only to such a limited extent, resulting in reduced power consumption for driving the video signal lines.

In the fourth aspect of the present invention, a selection period for the scanning signal lines to be selected at the same time is set such that the selection period lasts longer as the number of scanning signal lines to be selected at the same time increases, and the selection period corresponding to the scanning signal lines to be selected at the same time is longer than a period in which one scanning signal line is selected, so that a sufficiently long charging time is ensured, whereby it is possible to inhibit the drive capability of the video signal line drive circuit from being surpassed, thereby preventing display quality from being reduced.

In the fifth aspect of the present invention, at least a part of the order is determined so as to minimize an integrated value obtained by adding up absolute values of respective amounts of change in potential for at least a part of the video signal lines due to switching among the scanning signal lines, resulting in reduced power consumption for driving the video signal lines.

In the sixth aspect of the present invention, the next scanning signal line to be selected is determined so as to minimize the integrated value obtained by adding up the absolute values of the amounts of change in potential, and a scanning signal line to be selected immediately thereafter is determined so as to minimize the integrated value obtained by adding up the absolute values of the amounts of change in potential, resulting in reduced power consumption for driving the video signal lines.

In the seventh aspect of the present invention, the integrated value is calculated on the basis of a predetermined number of upper bits of digital grayscale data, whereby it is rendered possible to allow simplified computation, enhance the speed of the entire computation, and reduce power consumption for the computation.

In the eighth aspect of the present invention, absolute values of respective amounts of change in potential are added up for every predetermined number of video signal lines from among all of the video signal lines, the predetermined number being an integer multiple of two or more, and therefore, it is possible to reduce the amount of such computation and also reduce power consumption for the computation.

In the ninth aspect of the present invention, once the order is determined, the determined order is kept until a change in the image is detected, and therefore, it is possible to reduce computation appropriately in accordance with such a change in the image, resulting in power consumption for the computation.

The tenth aspect of the present invention renders it possible to use atypical address decoder as the scanning signal line drive circuit, thereby allowing production of a device with a simplified configuration, and also allowing the order of selecting the scanning signal lines to be changed freely with a simple feature.

In the eleventh aspect of the present invention, for example, even if the address decoder outputs a signal without determining an address, the state register does not pass the signal to its output stage, and therefore, a scanning signal can be outputted at an appropriate time.

In the twelfth aspect of the present invention, the second state register receives the second control signal, which is at least active during a period in which the address decoder is provided with addresses, and therefore, the scanning signal can have a shorter inoperative period. Thus, faster drive can be performed, and in the case where the drive frequency is invariable, it is possible to set a longer active period, and therefore, it is possible to ensure a sufficiently long charging time even for (pixel capacitance in) a high-definition display device.

In the thirteenth aspect of the present invention, the scanning signal line drive circuit stops or pauses its operation for a period until the next image is displayed, resulting in a reduction in power consumption.

In the fourteenth aspect of the present invention, the video signal line drive circuit stops or pauses its operation during the aforementioned period, resulting in a further reduction in power consumption.

The fifteenth aspect of the present invention renders it possible to allow a display method to achieve the same effects as those achieved by the first aspect of the invention.

MODES FOR CARRYING OUT THE INVENTION

Hereinafter, embodiments of the present invention will be described with reference to the accompanying drawings.

<1. First Embodiment>

<1.1 Overall Configuration and Operation of the Liquid Crystal Display Device>

Figure 1:
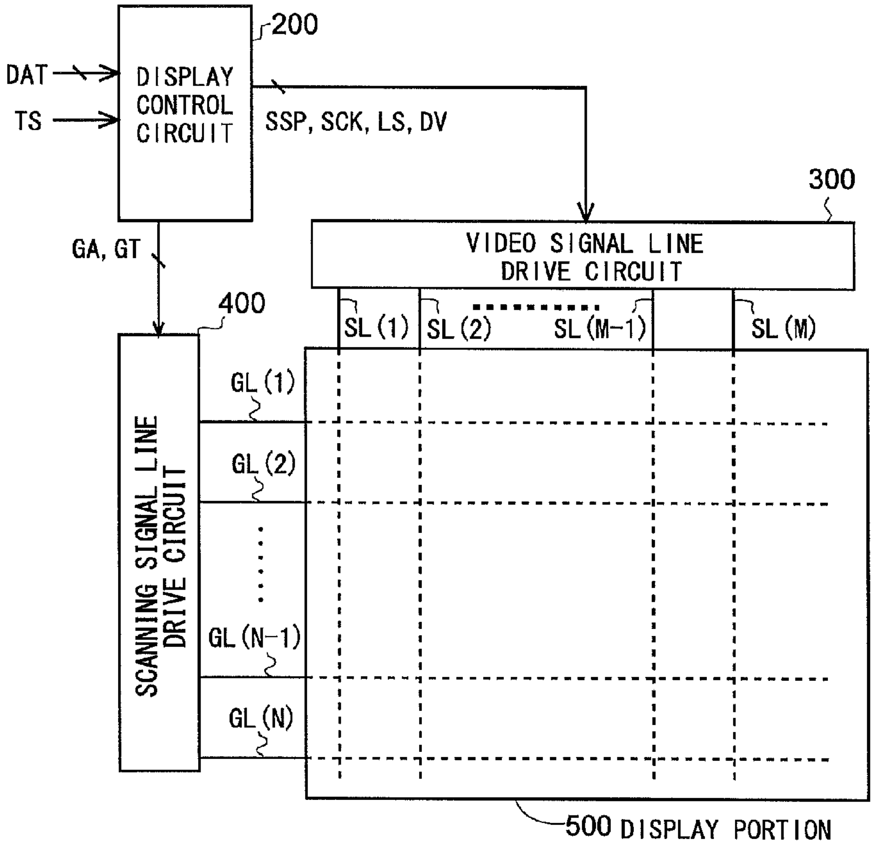
FIG. 1 is a block diagram illustrating the overall configuration of an active-matrix liquid crystal display device according to a first embodiment of the present invention.
Figure 2:
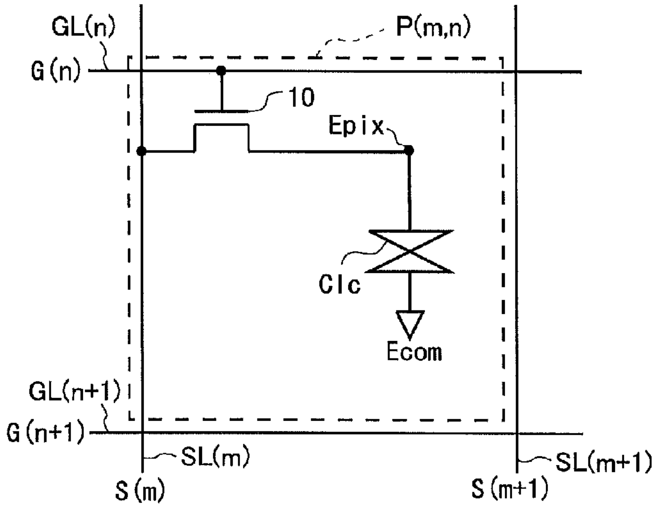
FIG. 2 is a circuit diagram illustrating an equivalent circuit of a pixel forming portion in the embodiment.

FIG. 1 is a block diagram illustrating the overall configuration of an active-matrix liquid crystal display device according to a first embodiment of the present invention. This liquid crystal display device includes a drive control portion consisting of a display control circuit 200, a video signal line drive circuit (source driver) 300, and a scanning signal line drive circuit (gate driver) 400, and also includes a display portion 500. The display portion 500 includes a plurality (M) of video signal lines SL(1) to SL(M), a plurality (N) of scanning signal lines GL(1) to GL(N), and a plurality (M×N) of pixel forming portions provided along the video signal lines SL(1) to SL(M) and the scanning signal lines GL(1) to GL(N). Note that in the following, a pixel forming portion provided near and in relation to the intersection of a scanning signal line GL(n) and a video signal line SL(m) (in the figure, near and to the lower right of the intersection) will be denoted by the reference symbol "P(m,n)". FIG. 2 illustrates an equivalent circuit of a pixel forming portion P(m,n) of the display portion 500 in the present embodiment.

As shown in FIG. 2, each pixel forming portion P(m,n) includes a TFT 10, which is a switching element having a gate terminal connected to the scanning signal line GL(n) and a source terminal connected to the video signal line SL(m) passing through the intersection or the next video signal line SL(m+1), a pixel electrode Epix connected to a drain terminal of the TFT 10, a common electrode Ecom provided commonly for the pixel forming portions P(i,j) (where i=1 to M, and j=1 to N), and a liquid crystal layer provided commonly for the pixel forming portions P(i,j) (where i=1 to M, and j=1 to N) between the pixel electrode Epix and the common electrode Ecom.

The pixel forming portion P(m,n) has liquid crystal capacitance (also referred to as "pixel capacitance") Clc formed by the pixel electrode Epix and the common electrode Ecom opposite thereto with the liquid crystal layer positioned therebetween. There are two video signal lines SL(m) and SL(m+1) arranged with the pixel electrode Epix positioned therebetween, and one of the two video signal lines is connected to the pixel electrode Epix via the TFT 10.

Note that the TFT 10 includes a semiconductor layer of amorphous silicon, which can be produced readily at low cost, but other well-known materials, such as In—Ga—Zn—O-based oxides and continuous grain silicon, can also be used. Particularly in the case where an In—Ga—Zn—O-based oxide semiconductor is used as the semiconductor layer, such a semiconductor offers a high-speed response and provides extremely low current leakage, and therefore, it is possible to realize a low-power consumption drive mode such as low-frequency drive (intermittent drive). Thus, in addition to the effects of the present embodiment, it is possible to further achieve a reduction in power consumption.

As shown in FIG. 1, the display control circuit 200 receives a display data signal DAT and a timing control signal TS, which are transmitted externally, and outputs digital image signals DV, as well as signals for controlling the timing of displaying an image on the display portion 500, including a source start pulse signal SSP, a source clock signal SCK, a latch strobe signal LS, a gate address signal GA, and a transfer signal GT.

Here, the externally derived display data signal DAT includes parallel data, each consisting of, for example, 18 bits in total, including red, green, and blue display data, each of which is 6-bit data to be provided to one pixel forming portion. These data are provided to corresponding video signal lines for the respective colors.

The video signal line drive circuit 300 receives the digital image signals DV, the source start pulse signal SSP, the source clock signal SCK, and the latch strobe signal LS outputted by the display control circuit 200, and applies drive video signals S(1) to S(M) to the video signal lines SL(1) to SL(M) in order to charge the pixel capacitance Clc (and auxiliary capacitance) of each pixel forming portion P(m, n) in the display portion 500. At this time, the video signal line drive circuit 300 sequentially holds the digital image signals DV, which specify the voltages to be applied to the video signal lines SL(1) to SL(M), with the timing of pulsation of the source clock signal SCK. Moreover, an unillustrated A/D conversion circuit converts the digital image signals DV being held into analog voltages with the timing of pulsation of the latch strobe signal LS. These analog voltages are applied simultaneously to all of the video signal lines SL(1) to SL(M) as the drive video signals via an unillustrated output amplifier circuit (or buffer circuit). That is, the present embodiment employs a line-sequential drive method as the method for driving the video signal lines SL(1) to SL(M).

Note that for simplification of explanation, the present embodiment is assumed to employ a frame inversion drive method in which the polarity of a voltage applied to the pixel liquid crystal is inverted every frame, but a line inversion drive method in which the polarity is inverted every frame and also every row of the display portion 500 or a dot inversion drive method in which the polarity is inverted every row and also every column may be employed.

In accordance with the gate address signal GA outputted by the display control circuit 200, the scanning signal line drive circuit 400 applies an active scanning signal, i.e., one of GL(1) to GL(N), to a corresponding one of the scanning signal lines GL(1) to GL(N). More specifically, the scanning signal line drive circuit 400 is an address decoder and selects one or more of the scanning signal lines GL(1) to GL(N) in accordance with an address(es) included in a received gate address signal GA, and applies an active scanning signal(s) to the selected scanning signal line(s) while the transfer signal GT is in active state. In the following, such an operation will also be expressed as selecting a row (which is a display row corresponding to a scanning signal line to be selected).

In FIG. 1, the scanning signal line drive circuit 400 is configured to provide the scanning signals to the scanning signal lines GL(1) to GL(N) only from one end, but the scanning signal line drive circuit 400 may be provided on each of the right and left sides of the display portion 500 so that the signals are provided from either end or both ends. By doing so, it is rendered possible to reduce the scale (size) of the circuit (on each side). Moreover, in the case where scanning signals are provided from both ends, they can be provided to the scanning signal lines GL(1) to GL(N) quickly, so that the scanning signals are less likely to be distorted, and therefore, the scanning lines can be selected fast and reliably.

As will be described later, in the case where more than one of all display rows have the same display content, the display control circuit 200 keeps changes in potential low for the video signal lines SL(1) to SL(M) by selecting two or more scanning signal lines corresponding to a part or all of such rows from among the scanning signal lines GL(1) to GL(N), determining addresses of the scanning signal lines sequentially, such that all of the scanning signal lines are selected ultimately, and outputting gate address signals GA.

Note that in the present embodiment, an unillustrated common electrode drive circuit is provided for performing frame inversion drive in which a common voltage Vcom, which is a voltage is to be provided to the common electrode of the liquid crystal panel, is inverted every frame. On the other hand, if the line inversion drive is to be performed here, the potential of the common electrode is preferably changed in accordance with the voltage inversion drive in order to keep the voltage swing of the video signal line low. More specifically, the common electrode drive circuit generates a voltage which switches between two reference voltage values every row and also every frame in accordance with a polarity inversion signal from the display control circuit 200, and supplies the voltage to the common electrode of the display portion 500 as the common voltage Vcom. With the above configurations, the line-inversion drive method can be realized.

In this manner, drive video signals are applied to the video signal lines SL(1) to SL(M), and scanning signals are applied to the scanning signal lines GL(1) to GL(N) in an order as will be described later, so that an image is displayed on the display portion 500. The configuration and the operation of the display control circuit 200 characterized by performing control such that a plurality of scanning signal lines are selected at the same time in a predetermined case will be described next with reference to FIG. 3.

<1.2 Configuration and Operation of the Display Control Circuit>

Figure 3:
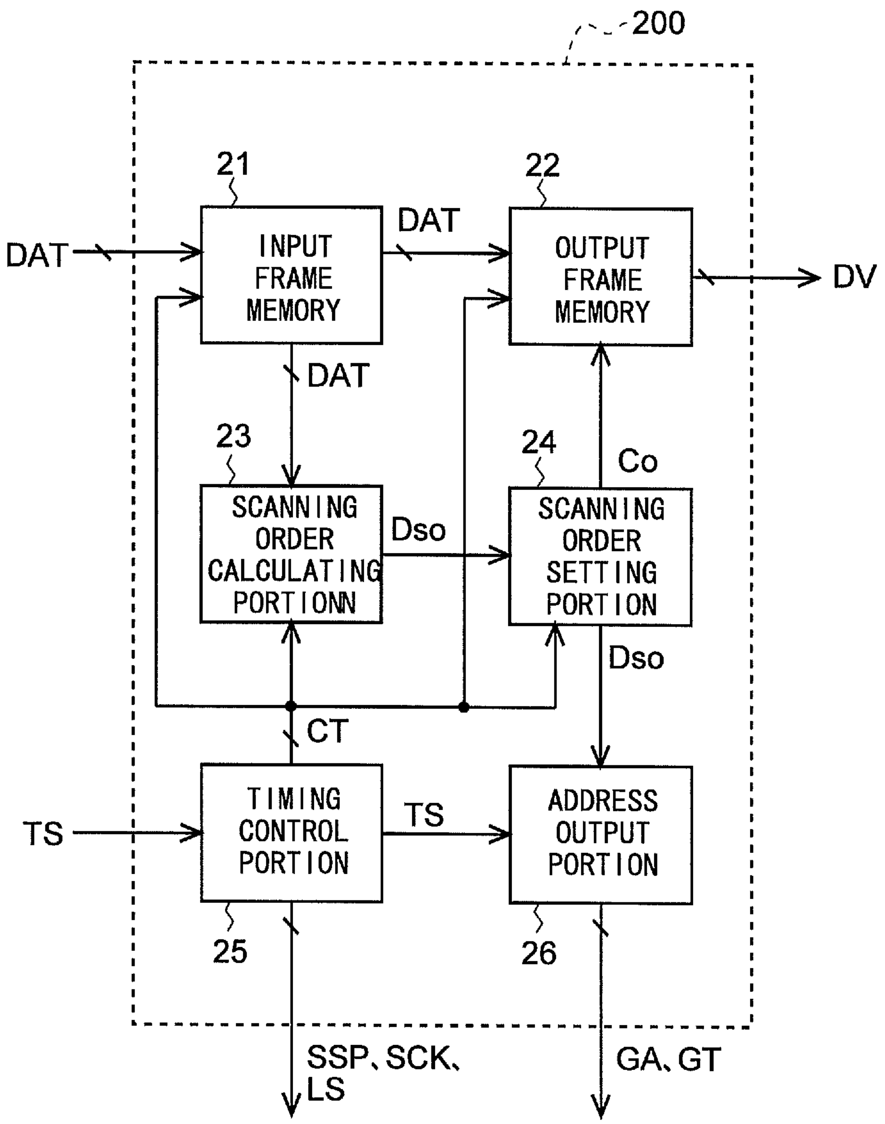
FIG. 3 is a block diagram illustrating the configuration of a display control circuit in the embodiment.

FIG. 3 is a block diagram illustrating the configuration of the display control circuit 200 in the present embodiment. The display control circuit 200 includes input frame memory 21, output frame memory 22, a scanning order calculating portion 23, a scanning order setting portion 24, a timing control portion 25, and an address output portion 26.

The timing control portion 25 receives an externally transmitted timing control signal TS, and outputs a control signal CT for controlling the operation of each of the input frame memory 21, the output frame memory 22, the scanning order calculating portion 23, and the scanning order setting portion 24, as well as a source start pulse signal SSP, a source clock signal SCK, and a latch strobe signal LS for controlling the timing of displaying an image on the display portion 500. Moreover, the timing control portion 25 provides the timing control signal TS to the address output portion 26.

The input frame memory 21 stores an external display data signal DAT for one frame. Moreover, in accordance with the control signal CT from the timing control portion 25, the input frame memory 21 provides the stored display data signal DAT for one frame to the output frame memory 22 and the scanning order calculating portion 23 with appropriate timing. Thereafter, the input frame memory 21 stores a display data signal DAT subsequently transmitted from outside for the next frame. Accordingly, the display data signal DAT stored in the output frame memory 22 is data that precedes the display data signal DAT stored in the input frame memory 21 by one frame. Note that the input frame memory 21 may be provided in an unillustrated host controller for providing the display data signal DAT to the display control circuit 200.

On the basis of the externally derived display data signal DAT, the scanning order calculating portion 23 determines whether, of all display rows, there are a plurality of rows with the same display content, and if there are, the scanning order calculating portion 23 determines two or more scanning signal lines corresponding to the rows from among the scanning signal lines GL(1) to GL(N), such that the determined lines are selected at the same time, and also determines addresses of all of the scanning signal lines, such that they are all selected ultimately.

For example, power consumption is maximized when the following selection operation is repeated: a minimum potential corresponding to a minimum grayscale value is initially applied to a video signal line, and then (after one horizontal scanning period), a maximum potential corresponding to a maximum grayscale value is applied to that video signal line. However, in this case, if odd rows are selected at the same time, and thereafter, even rows are selected at the same time, such an operation renders it possible to reduce the total amount of change in potential for the video signal line. In this manner, in all cases, including the case where a plurality of video signal lines are selected at the same time, by appropriately changing the order of selecting video signal lines, it is rendered possible to reduce the total amount of change in potential for the video signal lines. Therefore, the scanning order calculating portion 23 calculates such an appropriate order by the procedure shown in FIG. 4. Note that in the above, case, the number of scanning signal lines selected at the same time during one horizontal scanning period is a half of all scanning signal lines, and therefore, in some cases, the drive capability of the video signal line drive circuit 300 might be insufficient; the configuration taking this into consideration will be described later.

Figure 4:
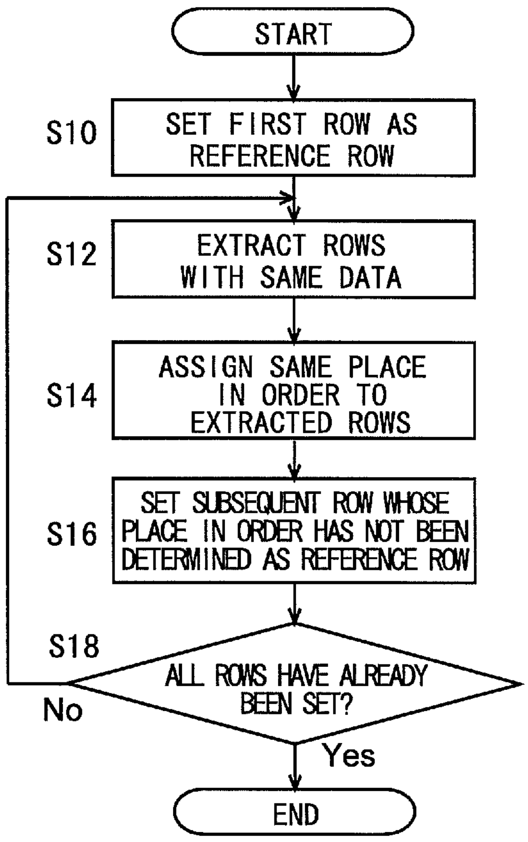
FIG. 4 is a flowchart illustrating the flow of a process by a scanning order calculating portion for calculating the order of selecting rows in the embodiment.

FIG. 4 is a flowchart illustrating the flow of the process by the scanning order calculating portion 23 for calculating the order of selecting rows. In step S10 shown in FIG. 4, the scanning order calculating portion 23 sets the first row as a reference row to be selected at the beginning.

Next, the scanning order calculating portion 23 determines for each row whether or not the row has the same display content as the reference row, and extracts such a row having the same display content (step S12). Note that to avoid any overlap, any row having been extracted once is excluded from the target for determination.

Here, the rows with the same display content encompass not only rows which have the same display content in that they have the same grayscale value and color across all columns but also rows which have the same display content in that they have the same grayscale values in the same (corresponding) columns. Examples of such rows include rows that are displayed with the same changes in grayscale value (i.e., the same gradations) in the direction of changes of the columns, as well as rows that are displayed in the same stripe. The scanning order calculating portion 23 compares pixel grayscale values (grayscale data) between a reference row and a row to be determined, and extracts the row as having the same data if it is identical to the reference row in all respects.

Subsequently, the scanning order calculating portion 23 assigns the same place in the order to all extracted rows with the same data, and stores the place in the order for each row (step S14). Note that the place in the order to be assigned is the same as the place of the reference row in the order, i.e., the lowest row number.

Next, the scanning order calculating portion 23 sets the subsequent row whose place in the order has not yet been determined, as a reference row (step S16), and determines whether all rows have already been set as such subsequent rows (step S18), and if the determination is negative (No in step S18), the procedure returns to step S12, which is repeated until all rows are set (S18→S12→ . . . →S18), or if the determination is that all rows have already been set (Yes in step S18), the process for one frame is complete. Thereafter, a display data signal DAT for the next frame is provided to the input frame memory 21, and a similar operation will be performed.

In this manner, any row with the same data as the initially set reference row is extracted, and the subsequent row whose place in the order has not yet been determined is used as the next reference row to perform a similar process of determining the next row to be set as a subsequent row; such a process will be repeated until all rows (for one frame) are selected. The scanning order calculating portion 23 generates scanning order data Dso specifying the order of selection (in which a plurality of rows might be selected at the same time), and provides the data to the scanning order setting portion 24.

Upon reception of the scanning order data Dso, the scanning order setting portion 24 provides the data to the address output portion 26, and also provides an order control signal Co to the output frame memory 22, thereby controlling the output frame memory 22 such that digital image signals DV are outputted in order of data corresponding to the order specified by the scanning order data Dso.

The output frame memory 22 receives and stores a display data signal DAT for one frame from the input frame memory 21, and the display data signal DAT has grayscale data arranged in a sequence on the premise that the scanning signal lines are selected in order of arrangement. The scanning order setting portion 24 controls the output frame memory 22 such that the data are outputted in the order as described above by changing (rearranging) the sequence (or without performing rearrangement if not necessary).

Furthermore, in accordance with the received scanning order data Dso, the address output portion 26 provides a gate address signal GA, which includes an address(es) specifying a corresponding scanning line(s), to the scanning signal line drive circuit 400, which includes an address decoder. In addition, a transfer signal GT, which is a timing signal to perform control such that a scanning signal is outputted when the timing signal is active, is provided to the scanning signal line drive circuit 400.

In accordance with the address(es) included in the received gate address signal GA, the scanning signal line drive circuit 400 selects one or more of the scanning signal lines GL(1) to GL(N) while the transfer signal GT is active. The configuration and the operation of the scanning signal line drive circuit 400 will be described in detail with reference to FIGS. 5 and 6.

Figure 5:
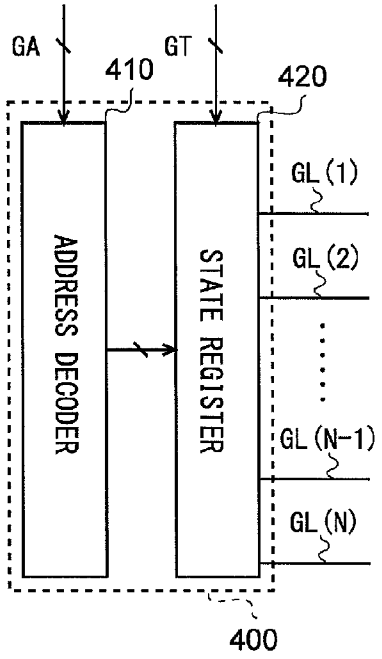
FIG. 5 is a block diagram illustrating in detail the configuration of a scanning signal line drive circuit in the embodiment.

FIG. 5 is a block diagram illustrating in detail the configuration of the scanning signal line drive circuit. The scanning signal line drive circuit 400 shown in FIG. 5 includes an address decoder 410 and a state register 420.

The address decoder 410 receives a gate address signal GA and outputs an active signal to select from among the scanning signal lines GL(1) to GL(N) one or more lines corresponding to an address(es) specified by address data AD included in the received signal.

The state register 420 receives a transfer signal GT and conveys to its output stage the state of the signal received from the address decoder 410 to select one or more of the scanning signal lines GL(1) to GL(N), while the transfer signal is active. More specifically, an active output signal is provided as a scanning signal to a corresponding (selected) one or more of the scanning signal lines GL(1) to GL(N). With this configuration, even if the address decoder 410 outputs a signal without determining an address, the state register 420 does not pass the signal to the output stage, and therefore, a scanning signal can be outputted at an appropriate time. These signals will be further described with reference to FIG. 6.

Figure 6:
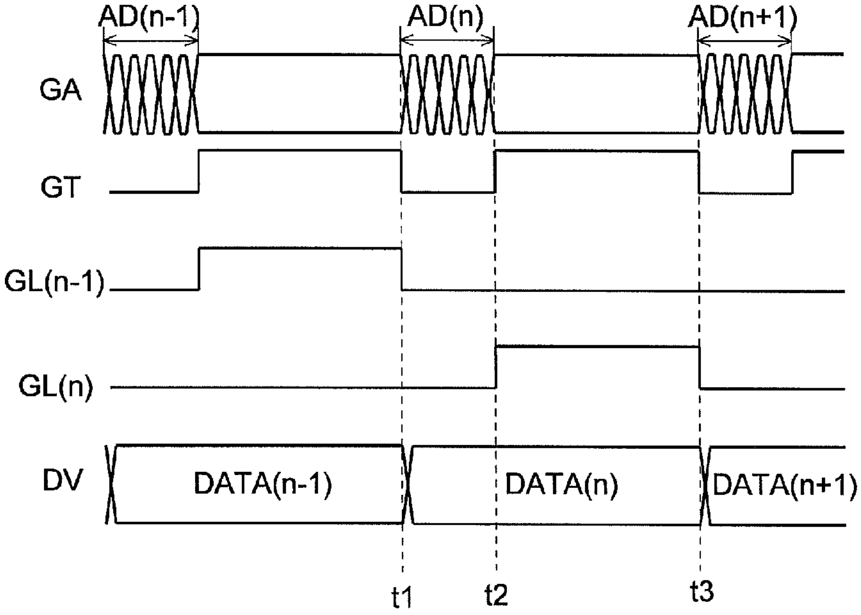
FIG. 6 provides timing charts showing waveforms of various signals involved in the drive by the scanning signal line drive circuit in the embodiment.

FIG. 6 provides timing charts showing waveforms of various signals involved in the drive by the scanning signal line drive circuit. As shown in FIG. 6, the gate address signal GA includes address data AD; during the period from time t1 to time t2 in which address data AD (n) specifying the n'th row to be selected is received, one or more corresponding scanning signal lines corresponding to the n'th row to be selected cannot be selected from among the scanning signal lines GL(1) to GL(N), no signal for such selection is outputted. During this period, the transfer signal GT is inactive. At this time, the state register 420 receives and holds an active signal to select from among the scanning signal lines GL(1) to GL(N) one or more lines corresponding to the address data AD (n) outputted by the address decoder 410.

Thereafter, during the period from time t2 to time t3, the transfer signal GT is kept active, so that the state register 420 passes the state signal being held to the output stage. Here, assuming that the address specified by the address data AD(n) represents the n'th scanning signal line to be selected, a scanning signal provided to the scanning signal line GL(n) corresponding to that address is kept active during the period from time t2 to time t3. During this period, a digital image signal DV, including DATA(n) which is corresponding grayscale data having been rearranged as described earlier, is outputted, and therefore, the corresponding grayscale data is provided to pixel forming portions corresponding to the row to be selected. Note that the row to which the n'th scanning signal line to be selected corresponds in the actual order of arrangement is determined by the number of rows with the same display content.

In this manner, the display control circuit 200 selects the scanning signal lines GL(1) to GL(N) in the order as described above, such that the rows with the same display content are selected at the same time, and further, the display control circuit 200 provides drive video signals S(1) to S(M) which are to be provided when the rows are selected, to their corresponding video signal lines SL(1) to SL(M). By doing so, it is rendered possible to reduce changes in potential for the video signal lines. This will be described using a simple and concrete example with reference to FIGS. 7 and 8.

Figures 7, 8:
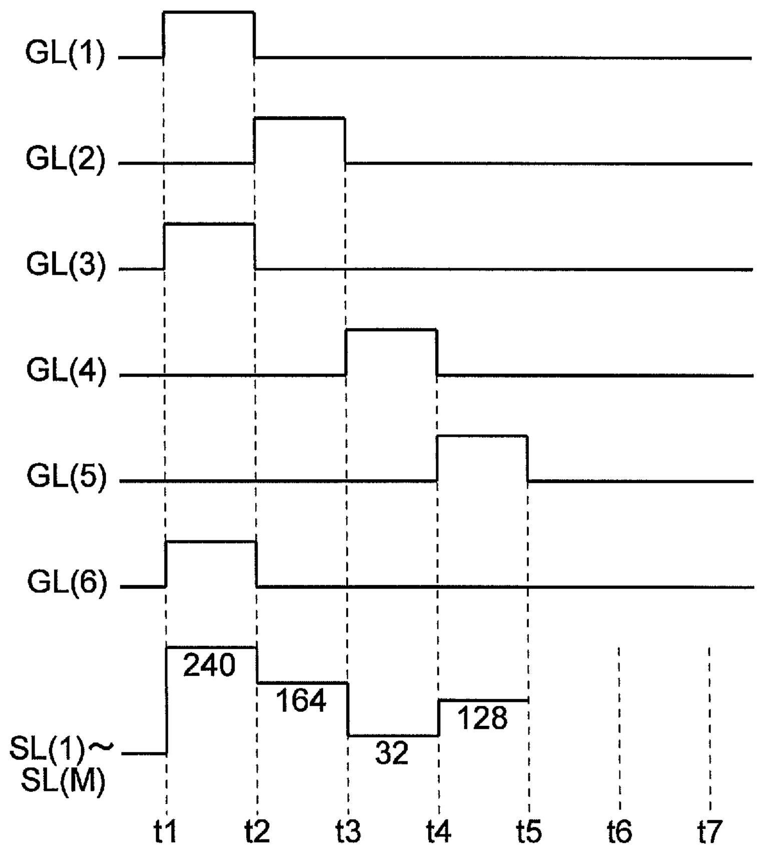
FIG. 7 is a table listing the order of selecting six scanning signal lines and grayscale values for corresponding display rows in the embodiment.
FIG. 8 provides waveform charts of various signals in a simple example of a display device in the embodiment.

FIG. 7 is a table listing the order of selecting six scanning signal lines and grayscale values for corresponding display rows. For a simple example where a display device has six scanning signal lines GL(1) to GL(6) and M video signal lines SL(1) to SL(M), FIG. 7 shows grayscale values and the order of selection where one or more scanning signal lines GL(j) (where j=1 to 6) are selected, the grayscale values corresponding to drive video signal voltages to be applied to all of the video signal lines SL(1) to SL(M). Note that for convenience of explanation, the drive video signal voltages applied to all of the video signal lines SL(1) to SL(M) have the same corresponding grayscale value, but they do not have to be entirely equal in grayscale value, as described earlier, so long as all grayscale values in the same corresponding columns are the same between two rows.

FIG. 8 provides waveform charts of various signals in the display device of the above simple example. As shown in FIG. 8, the scanning signal lines GL(1) to GL(6) are selected in the order of selection shown in FIG. 7, so that the scanning signal lines GL(1), GL(3), and GL(6) are kept active concurrently from time t1 to time t2, the scanning signal line GL(2) is kept active from time t2 to time t3, the scanning signal line GL(4) is kept active from time t3 to time t4, and the scanning signal line GL(5) is kept active from time t4 to time t5. Moreover, drive video signal voltages corresponding to the grayscale values shown in FIG. 7 are applied to the video signal lines SL(1) to SL(M) when their corresponding scanning signal lines are active. Note that for the sake of clarity, FIG. 8 shows the grayscale values corresponding to the potentials of the video signal lines SL(1) to SL(M), but the actual potentials are predetermined in accordance with their respective grayscale values. Moreover, the potentials of the video signal lines SL(1) to SL(M) after time t5 are not specifically determined, but it is assumed here that they are maintained at the same level.

As can be appreciated with reference to FIG. 8, for the video signal lines SL(1) to SL(M), the potential changes three times during the period from time t1 to time t5, and as a whole, the total amount of change in potential is naturally lower than in the case where the scanning signal lines are selected one by one in order of arrangement, so that the number of changes in potential is five. The same result can obviously be expected by calculating the total amount of actual change in potential. In this manner, by selecting the scanning signal lines such that rows with the same display content are selected at the same time, rather than by selecting the scanning signal lines in order of arrangement, it is rendered possible to reduce the total amount of change in potential for the video signal lines SL(1) to SL(M), so that power consumption for driving the video signal lines can be reduced.

<1.3 Effects>

As described above, in the present embodiment, the scanning signal lines are selected such that rows with the same display content are selected at the same time, and therefore, the number of changes in potential for the video signal lines becomes lower than in the case where the scanning signal lines are selected one by one in order of arrangement, resulting in a reduced total amount of change in potential. Thus, it is possible to reduce power consumption for driving the video signal lines.

<1.4 Variants of the First Embodiment>

<1.4.1 First Variant>

Next, a first variant of the present embodiment will be described. In the first variant, the configuration of the scanning signal line drive circuit differs in detail from that in the first embodiment in that the scanning signal has a shorter inoperative period. This will be described below with reference to FIGS. 9 and 10.

Figure 9:
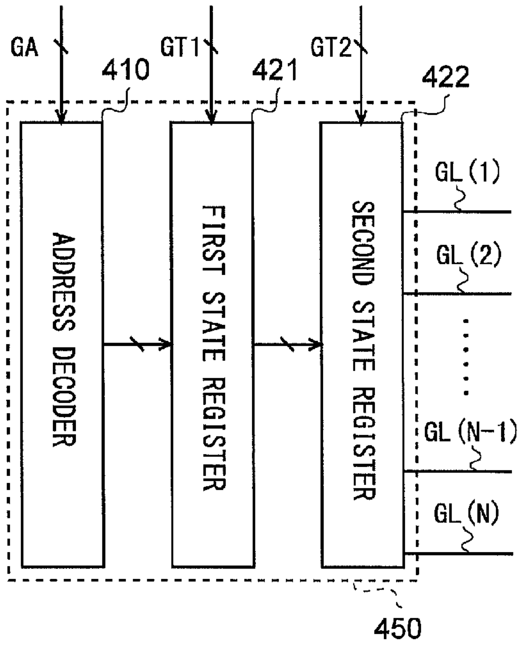
FIG. 9 is a block diagram illustrating in detail another example of the configuration of a scanning signal line drive circuit in a first variant of the embodiment.

FIG. 9 is a block diagram illustrating in detail another example of the configuration of the scanning signal line drive circuit. The scanning signal line drive circuit 450 shown in FIG. 9 includes an address decoder 410, a first state register 421, and a second state register 422. In this manner, in addition to the components of the scanning signal line drive circuit 400 in the first embodiment, the scanning signal line drive circuit 450 in the present embodiment further includes the second state register 422, and also differs from the first embodiment in that first and second transfer signals GT1 and GT2 different from each other are provided.

More specifically, the address decoder 410 operates in the same manner as in the first embodiment, and the first state register 421 has the same configuration as the state register 420 in the first embodiment, although the first state register 421 receives the first transfer signal GT1, which is different from the transfer signal for the state register 420. Moreover, the second state register 422 operates differently from the state register 420 in the first embodiment, but they have the same configuration.

Accordingly, while the first transfer signal GT1 is active, the first state register 421 conveys to its output stage the state of a signal received from the address decoder 410 to select one or more of the scanning signal lines GL(1) to GL(N). Moreover, while the second transfer signal GT2 is active, the second state register 422 similarly conveys to its output stage the state of the signal received from the first state register 421 to select one or more of the scanning signal lines GL(1) to GL(N). These signals will be further described with reference to FIG. 10.

Figure 10:
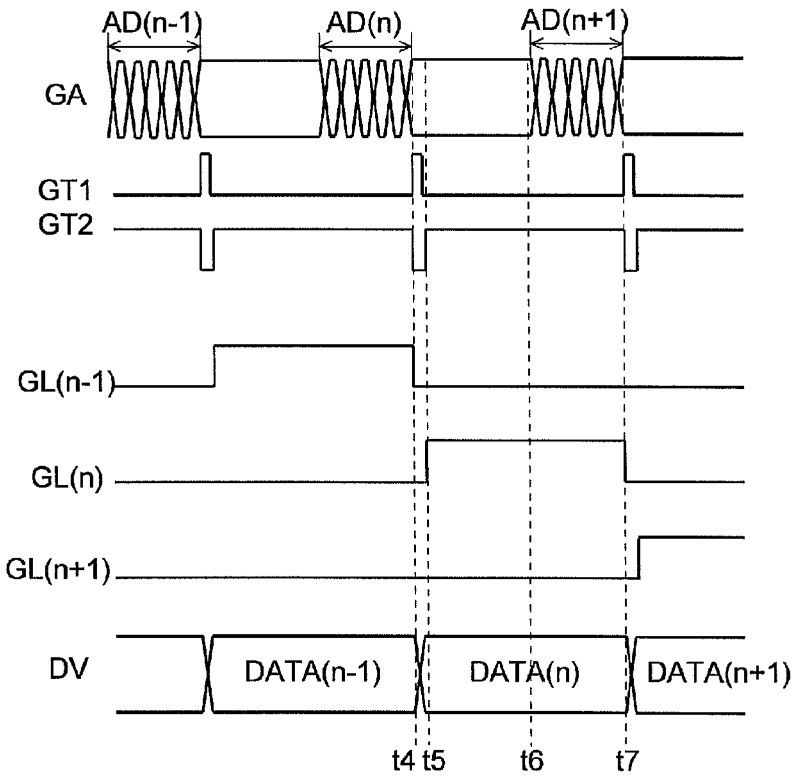
FIG. 10 provides timing charts showing waveforms of various signals involved in the drive by the scanning signal line drive circuit in the variant.

FIG. 10 provides timing charts showing waveforms of various signals involved in the drive by the scanning signal line drive circuit. As shown in FIG. 10, the gate address signal GA includes address data AD, and during the period from time t6 to time t7 in which address data AD(n+1), which is included in the address data AD and specifies the (n+1)'th row, is received, one or more lines corresponding to both the data and the (n+1)'th row cannot be selected from among the scanning signal lines GL(1) to GL(N). However, address data AD(n) specifying the n'th row to be selected has already been received by time t4, and therefore, from among the scanning signal lines GL(1) to GL(N), one or more lines corresponding to both the data and the (n+1)'th row can be selected at and after time t4. Therefore, in the present variant, unlike in the above embodiment, scanning signal lines are selected even during a period in which address data for the next place in the order is received.

More specifically, as shown in FIG. 10, the first transfer signal GT1 transitions from inactive to active state immediately after the end of the period in which the gate address signal GA includes the address data AD, and the active state is maintained thereafter for a predetermined period of time, here, from time t4 to immediately before time t5, so that an active scanning signal, which is received from the address decoder 410 and corresponds to the address data AD, is passed to the second state register. The second transfer signal GT2 transitions from active to inactive state, and the inactive state is maintained for a predetermined period of time, including the aforementioned period in which the first transfer signal GT1 is active, here, from time t4 to time t5, so that while the second state register keeps receiving the scanning signal, the state of a scanning signal being outputted by the second state register is stopped from changing. Thereafter, the second transfer signal GT2 is brought into active state, so that the output of the second state register is changed to the same state as the signal received from the first state register, and here, the state is maintained from time t5 to time t7. As a result, the state of the signal outputted by the address decoder 410 to select one or more of the scanning signal lines GL(1) to GL(N) is conveyed to the output stage of the first state register 421 and also further to the output stage of the second state register 422 having received the output signal from the first state register 421, so that the scanning signal provided to the scanning signal line GL(n), which is the n'th scanning signal line to be selected, is kept active from time t5 to time t7. During this period, a digital image signal DV, including DATA(n), which is corresponding grayscale data rearranged as described earlier, is outputted, so that the corresponding grayscale data is provided to pixel forming portions corresponding to the row to be selected.

In this manner, as in the first embodiment, the display control circuit 200 selects the scanning signal lines GL(1) to GL(N) in the order as described above, such that rows with the same display content are selected at the same time, and further, the display control circuit 200 provides the drive video signals S(1) to S(M) which are to be provided when the rows are selected, to their corresponding video signal lines SL(1) to SL(M), whereby the amount of change in potential for the video signal lines can be reduced similarly.

Furthermore, the scanning signal line drive circuit 450 is capable of outputting a scanning signal even during the period in which the address data AD is included, by means of the configuration and operation as shown in FIGS. 9 and 10, so that periods in which scanning signals are inactive, which intervene between periods in which the scanning signals are active, i.e., inoperative periods (e.g., the period from time t4 to time t5), can be set shorter than in the first embodiment (i.e., shorter than the inoperative period from time t1 to time t2 shown in FIG. 6). Thus, faster drive can be performed. In addition, in the case where the drive frequency is invariable, the active period can be set longer, whereby it is possible to ensure a sufficiently long charging time even for (pixel capacitance in) a high-definition display device.

<1.4.2 Second Variant>

Next, a second variant of the present embodiment will be described. In the second variant, rather than all rows with the same display content being selected at the same time, the number of simultaneously selectable rows is limited to two. More specifically, after all rows with the same data are extracted in step S12 shown in FIG. 4, rather than the same place in the order (of selection) being assigned to all of the extracted rows in step S14, such that they are selected at the same time, the number of rows to which the same place in the order is assigned is limited to two, and if the number of rows extracted exceeds that, then the next place in the order is assigned up to two rows, and the next succeeding place in the order is assigned similarly to excess rows extracted, with the same limitation. By doing so, it is rendered possible to prevent display quality from being reduced as a result of the drive capability of the video signal line drive circuit 300 being surpassed by an excessively large number of rows being selected at the same time. Note that for convenience of explanation, here, the number of simultaneously selectable rows is set at two, but this number is not limiting, and an appropriate number is determined typically in accordance with the drive capability of the video signal line drive circuit 300; details will be described later. Moreover, the number may be unlimited as in the first embodiment. This will be described below with reference to FIGS. 11 and 12.

Figures 11, 12:
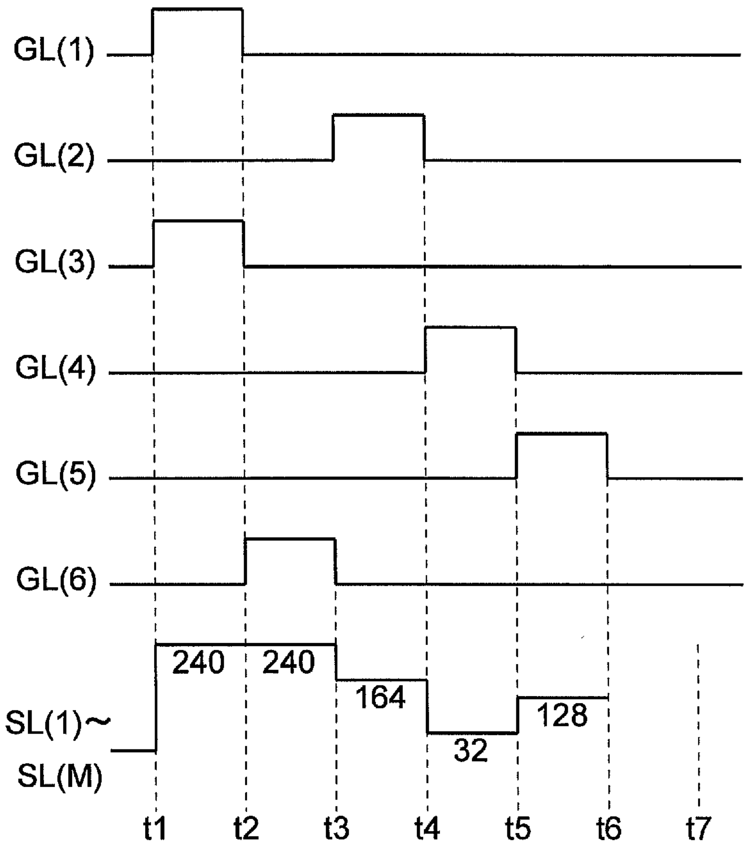
FIG. 11 is a table listing the order of selecting six scanning signal lines and grayscale values for corresponding display rows in a second variant of the embodiment.
FIG. 12 provides waveform charts of various signals in the variant.

Similar to FIG. 7, FIG. 11 is a table listing the order of selecting six scanning signal lines and grayscale values for corresponding display rows. Moreover, FIG. 11 is the same as FIG. 7 in grayscale values corresponding to drive video signal voltages applied to the video signal lines SL(1) to SL(M), but the order of selection here differs in part, because of the configuration as described above. More specifically, the scanning signal line GL(6) is not selected (first) simultaneously with the scanning signal lines GL(1) and GL(3), and takes the next place in the order of selection. This is because the present variant does not allow the number of simultaneously selectable rows to exceed the limit of two.

FIG. 12 provides waveform charts of various signals in the display device. As shown in FIG. 12, the scanning signal lines GL(1) to GL(6) are selected in the order of selection shown in FIG. 11, so that the scanning signal lines GL(1) and GL(3) are kept active concurrently from time t1 to time t2, the scanning signal line GL(6) is kept active from time t2 to time t3, the scanning signal line GL(2) is kept active from time t3 to time t4, the scanning signal line GL(4) is kept active from time t4 to time t5, and the scanning signal line GL(5) is kept active from time t5 to time t6.

As can be appreciated with reference to FIG. 12, the number of changes in potential for the video signal lines SL(1) to SL(M) during the period from time t1 to time t6 is three, rather than four. More specifically, during both the period from time t1 to time t2 and the period from time t2 to time t3, the same potential is kept so that there is no change in potential. Accordingly, as a whole, the total amount of change in potential is reduced as in the first embodiment, compared to the case where the scanning signal lines are selected in order of arrangement, so that the number of changes in potential is five.

Note that if the scanning signal line GL(6) takes another place in the order of selection, rather than the next place to the scanning signal lines GL(1) and GL(3) within the order of selection, the number of changes in potential is four, so that the total amount of change in potential increases slightly, but as a whole, the total amount of change in potential is lower than in the case where the scanning signal lines are selected one by one in order of arrangement, and therefore, the above configuration is still advantageous.

With the above configuration, it is possible to reduce power consumption for driving the video signal lines, as in the first embodiment, and by limiting the number of simultaneously selectable rows, it is rendered possible for the drive capability of the video signal line drive circuit 300 not to be surpassed, whereby it is possible to prevent display quality from being reduced.

Here, in the above example, the number of simultaneously selectable rows is set at two, but this number is preferably determined in accordance with the drive capability of the video signal line drive circuit 300, and specifically, it is calculated in the following manner. When the capacitance of a single video signal line SL(m) to be driven by the video signal line drive circuit 300 is Csbl, the pixel capacitance of a pixel forming portion is Cpix, and other capacitance, including parasitic capacitance, is Cp, the load capacitance Cload_s as seen from the video signal line drive circuit 300 at the time of driving the video signal line SL(m) can be represented by expression (1) below.

$$Cload\_s=Csbl+Cpix+Cp \quad (1)$$

Furthermore, the load capacitance Cload_m as seen from the video signal line drive circuit 300 at the time of driving n scanning signal lines GL(n) can be represented by expression (2) below based on expression (1).

$$Cload\_m=Csbl+n\cdot Cpix+Cp \quad (2)$$

Here, the value n is obtained as the highest integer at which the load capacitance ratio (Cload_m/Cload_s) is less than or equal to a predetermined design value Rcm (e.g., 1.2). The value n is set as the number of simultaneously selectable rows. By doing so, it is rendered possible for the drive capability of the video signal line drive circuit 300 not to be surpassed. Note that the above calculation example is merely illustrative, and various design techniques can be used as calculation bases.

<1.4.3 Third Variant>

Next, a third variant of the present embodiment will be described. In the third variant, all rows with the same display content are selected at the same time, as in the first embodiment, but the selection period is lengthened in accordance with the number of rows to be selected at the same time. By doing so, it is rendered possible to ensure a sufficiently long charging time during a normal selection period even if the drive capability of the video signal line drive circuit 300 is surpassed because of a large number of rows being selected at the same time, and therefore, it is possible to prevent display quality from being reduced. This will be described below with reference to FIGS. 13 and 14.

Figures 13, 14:
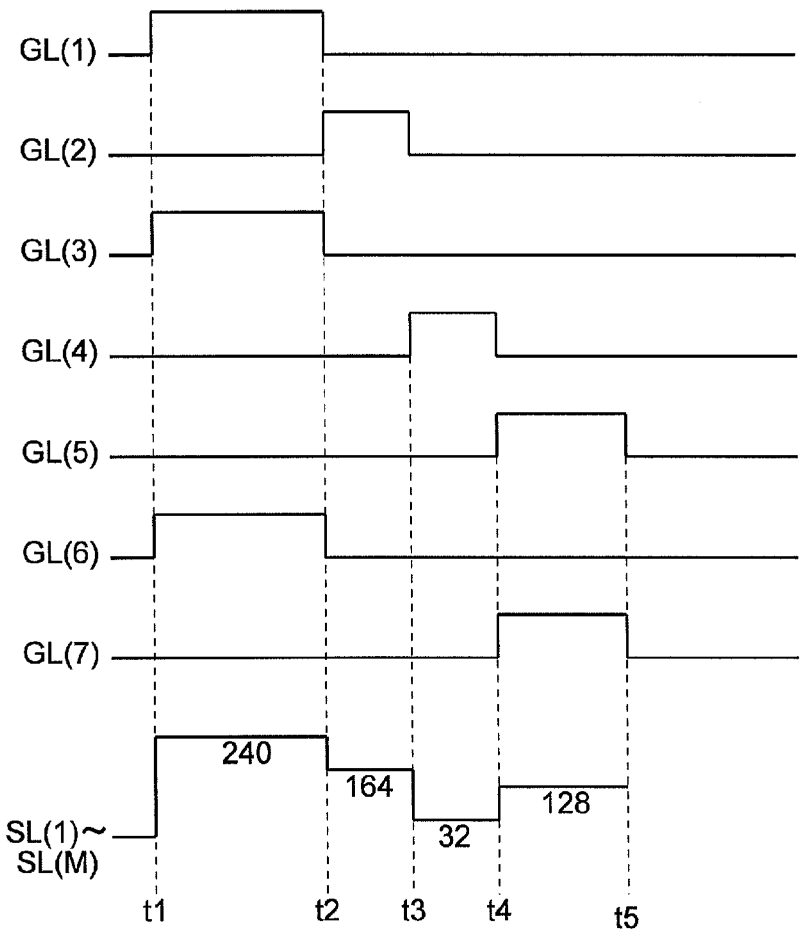
FIG. 13 is a table listing the order of selecting seven scanning signal lines and grayscale values for corresponding display rows in a third variant of the embodiment.
FIG. 14 provides waveform charts of various signals in the variant.

FIG. 13 is a table slightly different from that of FIG. 7, listing the order of selecting seven scanning signal lines and grayscale values for corresponding display rows. Moreover, the grayscale values in FIG. 13, which correspond to drive video signal voltages applied to the video signal lines SL(1) to SL(M), are almost the same as those in FIG. 7, but here, to simply describe the duration of a selection period, the scanning signal line GL(7) is selected fourth, simultaneously with the scanning signal line GL(5).

FIG. 14 provides waveform charts of various signals in the display device. As shown in FIG. 14, the scanning signal lines GL(1) to GL(7) are selected in the order of selection shown in FIG. 13, so that the scanning signal lines GL(1), GL(3), and GL(6) are kept active concurrently from time t1 to time t2, the scanning signal line GL(2) is kept active from time t2 to time t3, the scanning signal line GL(4) is kept active from time t3 to time t4, and the scanning signal line lines GL(5) and GL(7) are kept active from time t4 to time t5.

Furthermore, the selection period from time t4 to time t5 in which two scanning signal lines are selected at the same time is longer than the selection period from time t2 to time t3, which is a normal period in which one scanning signal line is selected, and the selection period from time t1 to time t2 in which three scanning signal lines are selected at the same time is further longer than the selection period from time t4 to time t5 in which two scanning signal lines are selected at the same time. Accordingly, as the number of scanning signal lines to be selected at the same time increases, the duration of a corresponding selection period is set longer, so that a sufficiently long charging time can be ensured.

Note that as can be appreciated with reference to FIG. 14, the number of changes in potential for the video signal lines SL(1) to SL(M) is three during the period from time t1 to time t5, and therefore, as a whole, the total amount of change in potential is reduced as in the first embodiment, compared to the case where the scanning signal lines are selected in order of arrangement, so that the number of changes in potential is five.

With the above configuration, it is possible to reduce power consumption for driving the video signal lines, as in the first embodiment, and as the number of rows to be selected at the same time increases, the duration of a corresponding selection period is set longer, whereby it is possible for the drive capability of the video signal line drive circuit 300 not to be surpassed, thereby preventing display quality from being reduced.

Here, in the example shown in FIG. 14, the selection period from time t4 to time t5 is 1.5 times as long as a normal selection period, and the selection period from time t1 to time t2 is twice as long as a normal selection period, but such periods are set appropriately in accordance with various design choices.

Furthermore, such a period is preferably set in accordance with the drive capability of the video signal line drive circuit 300, as in the second variant, and more specifically, it can be calculated on the basis of expressions (1) and (2) by multiplying the duration Is of a normal selection period by the aforementioned additional capacitance ratio (Cload_m/Cload_s) (along with an appropriate coefficient). This calculation renders it possible for the drive capability of the video signal line drive circuit 300 not to be surpassed. Note that the above calculation example is merely illustrative, and various design techniques can be used as calculation bases.

Furthermore, in the third variant, the number of simultaneously selectable rows is not specifically limited, but the number of selectable rows may be limited as in the second variant. In such a case, the number of simultaneously selectable rows may be set considering the duration of the selection period that is set to be longer than a normal selection period.

<1.4.4 Fourth Variant>

Next, a fourth variant of the present embodiment will be described. In the fourth variant, the mode of selecting the scanning signal lines is the same as in the first embodiment, except that a part or all of the address decoder and the state register included in the scanning signal line drive circuit 400 are set in a pause or halt state during a time period after all scanning signal lines have been selected until selection of the next scanning signal line starts in the next frame period (such a period will be referred to below as a "pause period"; for example, the period from time t5 to time t7 shown in FIG. 8 is a pause period). Moreover, unillustrated output amplifier circuits (or buffer circuits) included in the video signal line drive circuit 300 are set in a pause state during such a pause period.

More specifically, the output amplifier circuits coupled to the video signal lines are connected commonly to an enable line, and when the potential of the enable line is set at an inactive level, all of the output amplifier circuits are brought into a non-operating state. In addition, the enable line is connected to the display control circuit 200, and the display control circuit 200 performs control such that the potential of the enable line is at an inactive level during the pause period. By doing so, the operation of the output amplifier circuits is paused during the pause period, resulting in reduced power consumption.

Note that the circuits that are to be set in the state of pausing outputs are the output amplifier circuits, but this is merely an illustrative example, and all or a part of the circuits included in the video signal line drive circuit 300, such as the A/D conversion circuit and latch circuits, may be set in a pause or halt state. Alternatively, at least a part of the circuits in the display device, including all other circuits in addition to the above, may be set in a pause or halt state. Moreover, to set the circuits in a pause or halt state, various well-known configurations, such as a configuration in which the potential of a power line is changed, can also be employed in addition to the configuration in which state transitions are caused by means of a control line.

<2. Second Embodiment>

<2.1 Overall Configuration and Operation>

The configuration and operation of the display device in the present embodiment are approximately the same as those of the display device shown in FIGS. 1 and 2, the configuration and operation of the display control circuit in the present embodiment are approximately the same as those of the display control circuit 200 shown in FIG. 3, therefore, similar components are denoted by the same reference characters, and any descriptions about similar configurations and operations will be omitted.

The display control circuit 200 in the present embodiment outputs gate address signals GA after determining the order of selecting the scanning signal lines such that scanning signal lines corresponding to rows with the same display content are selected at the same time, and then determining addresses sequentially such that the scanning signal lines GL(1) to GL(N) are selected one by one or a plurality sets of rows with the same display content are selected sequentially, so that all of the scanning signal lines are selected ultimately, in such a manner that the total amount (integrated value) of change in potential for the video signal lines SL(1) to SL(M) is minimized. Accordingly, the scanning order calculating portion 23 included in the display control circuit 200 in the present embodiment operates differently from that in the first embodiment. Details will be given below.

The scanning order calculating portion 23 extracts rows with the same display content and determines an order of selection in which the extracted rows are selected at the same time, as in the first embodiment, and thereafter, the scanning order calculating portion 23 further determines an order as described below. Specifically, on the basis of an externally derived display data signal DAT, the scanning order calculating portion 23 calculates which row is to be selected next after a reference row is selected (i.e., after one horizontal scanning period) in order to minimize the total amount (integrated value) of change in potential for the video signal lines SL(1) to SL(M). Changes in potential of a video signal line means charge/discharge of the capacitance of the video signal line, including parasitic capacitance, and therefore, power consumption increases as the total amount of change in potential increases.

For example, power consumption is maximized when the following selection operation is repeated: a minimum potential corresponding to a minimum grayscale value is initially applied to a video signal line, and then (after one horizontal scanning period), a maximum potential corresponding to a maximum grayscale value is applied to the video signal line. However, in this case, the total amount of change in potential for the video signal lines can be reduced by selecting odd rows sequentially and thereafter selecting even rows sequentially. In this manner, the total amount of change in potential for the video signal lines can be reduced by changing the order of selection appropriately. Therefore, the scanning order calculating portion 23 calculates such an appropriate order by the procedure shown in FIG. 15.

Figure 15:
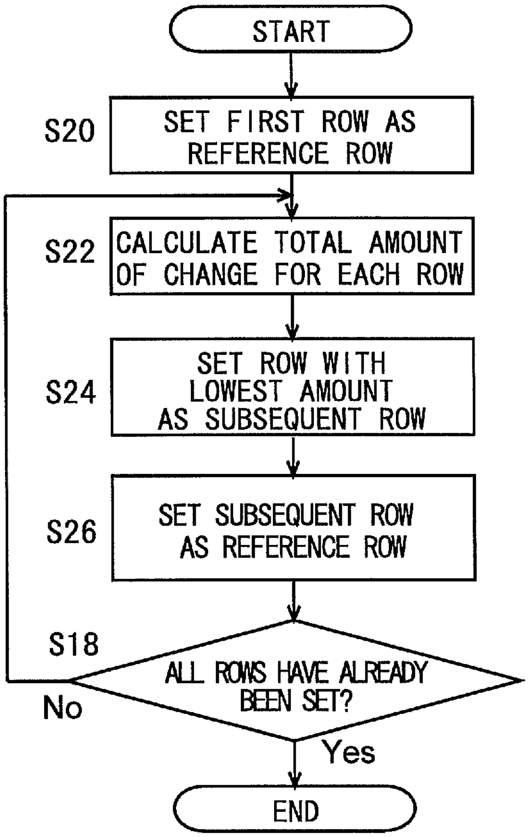
FIG. 15 is a flowchart illustrating the flow of a process by a scanning order calculating portion for calculating the order of selecting rows in a second embodiment of the present invention.

FIG. 15 is a flowchart illustrating the flow of the process by the scanning order calculating portion 23 for calculating the order of selecting rows. In step S20 shown in FIG. 15, the scanning order calculating portion 23 sets the first row as a reference row to be selected at the beginning. As will be described later, the reference row is a row to be referenced in order to calculate the total amount (integrated value) of change that occurs in potential for the video signal lines when another row is selected next. The process of setting the first row as a row to be selected at the beginning of a frame is simple, and such a configuration is preferable when the video signal lines SL(1) to SL(M) have variable potentials during a vertical blanking period (i.e., no specific potential is provided). This configuration will be referred to as a first configuration.

However, in some cases, a specific potential might be applied to the video signal lines SL(1) to SL(M) at the time of power-on or standby of the device or during a vertical blanking period. In such a case, if the first row is to be always selected at the beginning, as in the first configuration, the total amount of change in potential for the video signal lines with respect to the specific potential due to the first row being selected might be significant. Therefore, in such a case, instead of performing the processing in step S20, a row with the lowest total amount (integrated value) of change in potential for the video signal lines SL(1) to SL(M) relative to the specific potential is preferably selected as the initial reference row. This configuration will be referred to as a second configuration.

Furthermore, in some cases, during the vertical blanking period, rather than the specific potential being applied as described above, a potential applied to the row selected at the end of a frame might be maintained on the video signal lines SL(1) to SL(M). In this case also, if the first row is to be always selected at the beginning, as in the first configuration, the total amount of change in potential for the video signal lines due to the first row being selected might become significant. Therefore, in such a case, a preferable configuration is such that instead of performing the processing in step S20, a row with the lowest total amount (integrated value) of change in potential for the video signal lines SL(1) to SL(M) relative to the potential applied to the row selected at the end of the frame is selected as the initial reference row. This configuration will be referred to as a third configuration.

In this manner, the first configuration which corresponds to the processing in step S20 in the present embodiment might increase the amount of change in potential for the video signal lines depending on the operation mode of the device, and therefore, the second or third configuration is employed in accordance with the operation mode in order to further reduce power consumption.

Next, for each row, the scanning order calculating portion 23 calculates the total amount (integrated value) of change that occurs in potential for the video signal lines upon selection of the next row after the reference row (step S22). Note that thereafter, one or more than one subsequent rows to which the same place in the order is assigned, i.e., they have the same display content, might be selected at a time, but for simplification of explanation, an example where there are (by chance) no rows with the same display content will be described.

Here, if the total amount of change in potential is not calculated for each row, normally, it is not possible to determine what number row from the reference row is to be selected in order to minimize the total amount of change in potential for the video signal lines SL(1) to SL(M). Therefore, the total amount of change in potential as represented by expression (3) below is calculated for each row.

$$\sum_{i=1}^{M} (Vaj - Vji)^2 \tag{3}$$

In expression (3), "a" represents the reference row (whose initial value is 1), "i" represents the number (column number) for the video signal line, and "j" represents the number for the scanning signal line, i.e., the number for the row. In addition, "Vji" represents the potential applied to the i'th video signal line (i'th column) when the j'th row (the j'th scanning signal line) is selected.

The scanning order calculating portion 23 calculates the total amount of change represented by expression (3) sequentially for each row (more specifically, the calculation is performed by sequentially assigning the values in the range of from j=1 to j=N), and obtains the row with the lowest of all of the total amounts of change in potential for the video signal lines calculated for all rows, so that the obtained row is set as the row that is to be selected next (hereinafter, referred to as the "subsequent row") (step S24).

Here, the amounts of change in potential for the video signal lines is computed on the basis of grayscale data corresponding to video signals to be applied to the video signal lines. More specifically, for both the reference row and the row for which computations are to be performed, grayscale data corresponding to the columns (the video signal lines) are read from the input frame memory 21, and the total amounts (integrated values) of change in potential are calculated in accordance with expression (3).

Note that if the speed of calculation allows, the total amount of change in potential is preferably obtained by adding up the amounts of change in potential actually having occurred for the video signal lines during each horizontal scanning period. For example, the scanning order calculating portion 23 has a (preset) table (referred to below as a "grayscale voltage table") showing the correspondence between grayscale values (e.g., from 0 to 255) indicated by display data corresponding to drive video signals to be applied to video signal lines and voltage values for the drive video signals. On the basis of the grayscale voltage table, the scanning order calculating portion 23 calculates the amount of change in potential that indicates a change in potential from the immediately preceding horizontal scanning period for a video signal line provided with a corresponding drive video signal for externally received display data.

Subsequently, the scanning order calculating portion 23 sets the aforementioned subsequent row as a reference row (step S26), and determines whether or not all rows have already been set as the subsequent rows (step S28); if not all of the rows have yet been set (No in step S28), the process returns to step S22 and will be repeated until all of the rows are set (S28→S22→ . . . →S28), or if all of the rows have already been set (Yes in step S28), the process for one frame ends. Thereafter, a display data signal DAT for the next frame is provided to the input frame memory 21, and a similar operation to the above will be performed.

In this manner, all rows (for one frame) are selected by repeating the following: the row with the lowest total amount of change in potential relative to the initially set reference row is selected as a subsequent row, and the row having been selected as the subsequent row is used as the next reference row in a similar operation to determine the next row to be set as a subsequent row. The scanning order calculating portion 23 generates scanning order data Dso specifying the order of selection, and provides the data to the scanning order setting portion 24.

The scanning order setting portion 24 provides the received scanning order data Dso to the address outputting portion 26 as well as an order control signal Co to the output frame memory 22 in order to control the output frame memory 22 such that digital image signals DV are outputted in the order of data corresponding to the order specified by the scanning order data Dso. Note that as described earlier, there are a plurality of rows to which the same place within the scanning order is assigned.

The output frame memory 22 receives and stores a display data signal DAT for one frame from the input frame memory 21, and the display data signal DAT has grayscale data arranged in a sequence on the premise that the scanning signal lines are selected in order of arrangement. The scanning order setting portion 24 controls the output frame memory 22 such that the data are outputted in the order as described above by changing (rearranging) the sequence or without performing rearrangement.

Furthermore, in accordance with the received scanning order data Dso, the address output portion 26 provides a gate address signal GA, which includes an address(es) specifying a corresponding scanning line(s), to the scanning signal line drive circuit 400, which functions as an address decoder. The scanning signal line drive circuit 400 selects one of the scanning signal lines GL(1) to GL(N) in accordance with the address included in the received gate address signal GA.

In this manner, the display control circuit 200 selects the scanning signal lines GL(1) to GL(N) in the aforementioned order, and supplies the video signal lines SL(1) to SL(M) with their corresponding drive video signals S(1) to S(M) to be provided when the rows are selected. By doing so, the total amount of change in potential for the video signal lines can be minimized. This will be described using a simple and specific example with reference to FIGS. 16 and 17.

Figures 16, 17:
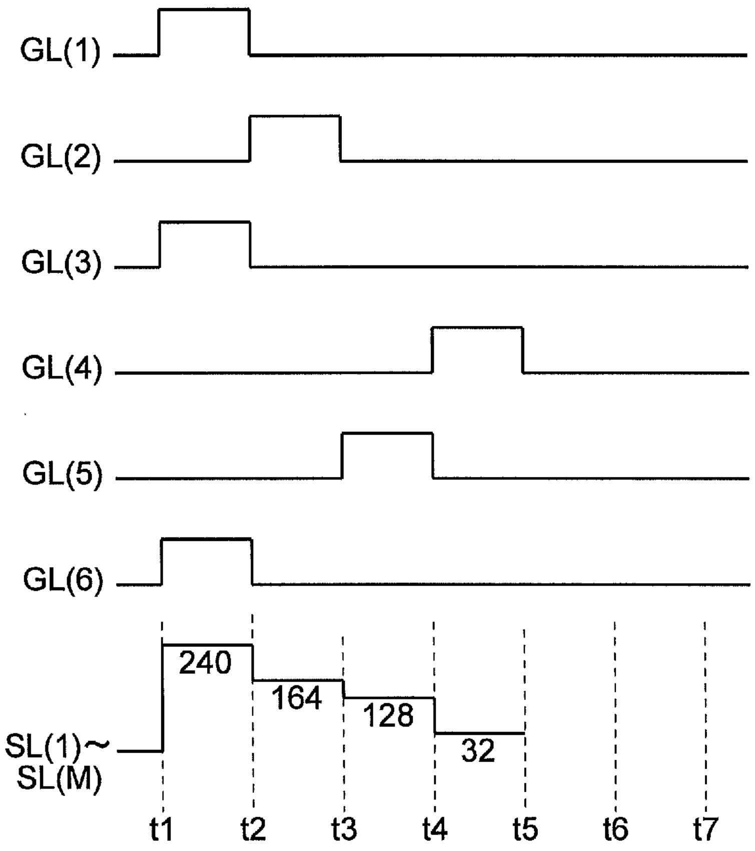
FIG. 16 is a table listing the order of selecting six scanning signal lines and grayscale values for corresponding display rows in the embodiment.
FIG. 17 provides waveform charts of various signals in the embodiment.

Similar to FIG. 7, FIG. 16 is a table listing the order of selecting six scanning signal lines and grayscale values for corresponding display rows. Moreover, FIG. 16 is the same as FIG. 7 in grayscale values, which correspond to drive video signal voltages applied to the video signal lines SL(1) to SL(M), but the order of selection here differs in part, because of the configuration as described above. More specifically, there are differences in that the scanning signal line GL(5) is selected third, and the scanning signal line GL(4) is selected fourth. Although the order of selection for the next frame is not shown in FIG. 16, the scanning signal line GL(1), which corresponds to the first row, is always selected first, as has been described earlier in conjunction with the first configuration, and therefore, the order of selection is the same as in the preceding frame.

FIG. 17 provides waveform charts of various signals in the display device. As shown in FIG. 17, the scanning signal lines GL(1) to GL(6) are selected in the order of selection shown in FIG. 16. Therefore, as can be appreciated in comparison with the case of FIG. 8, changes in potential for the video signal lines SL(1) to SL(M) are gradual from time t1 to time t5, and further, the total amount of change in potential is minimized. If the corresponding drive video signal voltages are applied in the same order as the order of arrangement of the scanning signal lines, there are significant changes at times t3 and t4, so that the total amount of change in potential for the video signal lines SL(1) to SL(M) becomes considerably greater than in the case shown in FIG. 17. In this manner, by selecting the scanning signal lines in such an order as to make the total amount of change in potential for the video signal lines lower than in the case where the scanning signal lines are selected in order of arrangement, it is rendered possible to reduce power consumption for driving the video signal lines. While the description directed to FIGS. 16 and 17 has been given taking the first configuration as an example, but the same description applies to the third configuration.

Furthermore, in the above configuration, for convenience of explanation, after a plurality of rows with the same display content are extracted and numbered in sequence, the order of the rows is determined such that the total amount of change in potential is minimized, as described above, but the order can be determined by a series of processing tasks.

<2.2 Effects>

As described above, in the present embodiment, the order of selecting all rows (for one frame) is determined by repeating the following: the row with the lowest total amount of change in potential relative to a reference row is selected as a subsequent row, and the row having been selected as the subsequent row is used as the next reference row in a similar operation to determine the next row to be set as a subsequent row, and the scanning signal lines are selected in the determined order. With this configuration, power consumption for driving the video signal lines can be reduced by selecting the scanning signal lines in such an order that the total amount of change in potential for the video signal lines becomes smaller than in the case where the scanning signal lines are selected in order of arrangement.

<2.3 Variants of the Second Embodiment>

<2.3.1 First Variant>

Figures 18, 19:
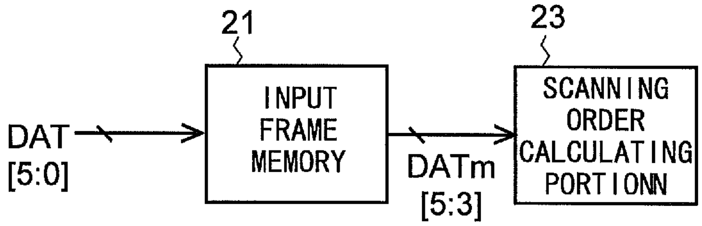
FIG. 18 is a partial block diagram illustrating display data signals inputted to input frame memory and a scanning order calculating portion in a first variant of the embodiment.
FIG. 19 is a table listing the order of selecting four scanning signal lines and values for voltages to be applied to a video signal line in the variant, as well as corresponding input data and determination data.

Next, a first variant of the present embodiment will be described with reference to FIGS. 18 and 19. FIG. 18 is a partial block diagram illustrating a display data signal being inputted to the input frame memory and then to the scanning order calculating portion. As has been described earlier, the input frame memory 21 externally receives a display data signal DAT. The display data signal DAT includes 6-bit grayscale data for each pixel (i.e., each of the R, G, and B pixels), and none of the bits is masked. In the figure, the symbol [5:0], which denotes the contents of the data, is assigned to the display data signal DAT. Moreover, the display data signal DATm provided from the input frame memory 21 to the scanning order calculating portion 23 is the same signal as the display data signal DAT, but the lower three bits of the 6-bit grayscale data are masked. In the figure, the symbol [5:3], which denotes the contents of the data, is assigned to the display data signal DATm. The data for the unmasked upper three bits of the display data signal DATm will be referred to below as determination data.

FIG. 19 is a table listing the order of selecting four scanning signal lines and values for voltages to be applied to a video signal line, as well as corresponding input data and determination data. Here, for simplification of explanation, in a simplified display device including only one video signal line SL(1), as shown in FIG. 19, the input data represent grayscale data values which correspond to the drive video signal voltages Vj1 (V11 to V41) applied to the video signal line SL(1), and the determination data is the data for the upper three bits (e.g., "111") from the 6-bit input data (e.g., "111010").

In step S22 shown in FIG. 15 as described earlier, the scanning order calculating portion 23 sequentially calculates the total amount of change represented by expression (3) for each row, but unlike in the above embodiment, 6-bit input data (grayscale data) corresponding to a video signal to be applied to the video signal line is not used as a whole, and the upper three bits from the six bits are used (i.e., the lower three bits are masked). As has been described earlier, this 3-bit data is referred to herein as determination data. In the example shown in FIG. 19, there is only one video signal line, and therefore, the determination data itself corresponds to the total amount of change in potential, but in actuality, the determination data denotes an integrated value of the amounts of change in potential for a plurality of video signal lines.

By using the upper bits in this manner, the exact amount of change in potential cannot be calculated because the amount to be represented by the lower bits is removed, but the amount of computation can be reduced, and therefore, this configuration is preferable when the computation speed is not sufficient. Further, even if the computation speed is satisfactory, the configuration is still preferable in that power consumption for computation can be reduced.

Note that the upper bits are not limited to three bits so long as the amount of change in potential can be calculated, and the number of upper bits can be set within the range of less than the number of bits in the entire input data.

<2.3.2 Second Variant>

Furthermore, to reduce the amount of computation, an integrated value of the amounts of change in potential for some of the video signal lines SL(1) to SL(M), rather than for all of them, may be calculated by skipping their changes in potential (without computing them). For example, the total amount of change in potential represented by expression (4) below, rather than by expression (3), may be calculated for each row.

$$\sum_{i=1}^{M/3} (Va(3i) - Vj(3i))^2 \quad (4)$$

Note that in expression (4), computation is performed for every third video signal line, so that the total amount of change in the potential to be applied to every video signal line corresponding to a multiple of 3 is calculated, but the video signal lines for which computation is to be performed are not specifically limited. However, to perform computation uniformly across the entire screen, it is preferable to perform computation for every video signal line corresponding to an integer multiple of 2 or more, as shown in expression (4).

Furthermore, by applying the configuration of the first variant to the configuration of the second variant, it is rendered possible to further reduce power consumption. Note that the approach to determine the order may be applied partially.

<3. Third Embodiment>

<3.1 Overall Configuration and Operation of the Liquid Crystal Display Device>

An active-matrix liquid crystal display device according to the present embodiment operates in the same manner as the display device of the first embodiment shown in FIG. 1 and have the same configuration as the first or second embodiment except for some features of the display control circuit, therefore, the same components are denoted by the same characters, and any descriptions thereof will be omitted.

Figure 20:
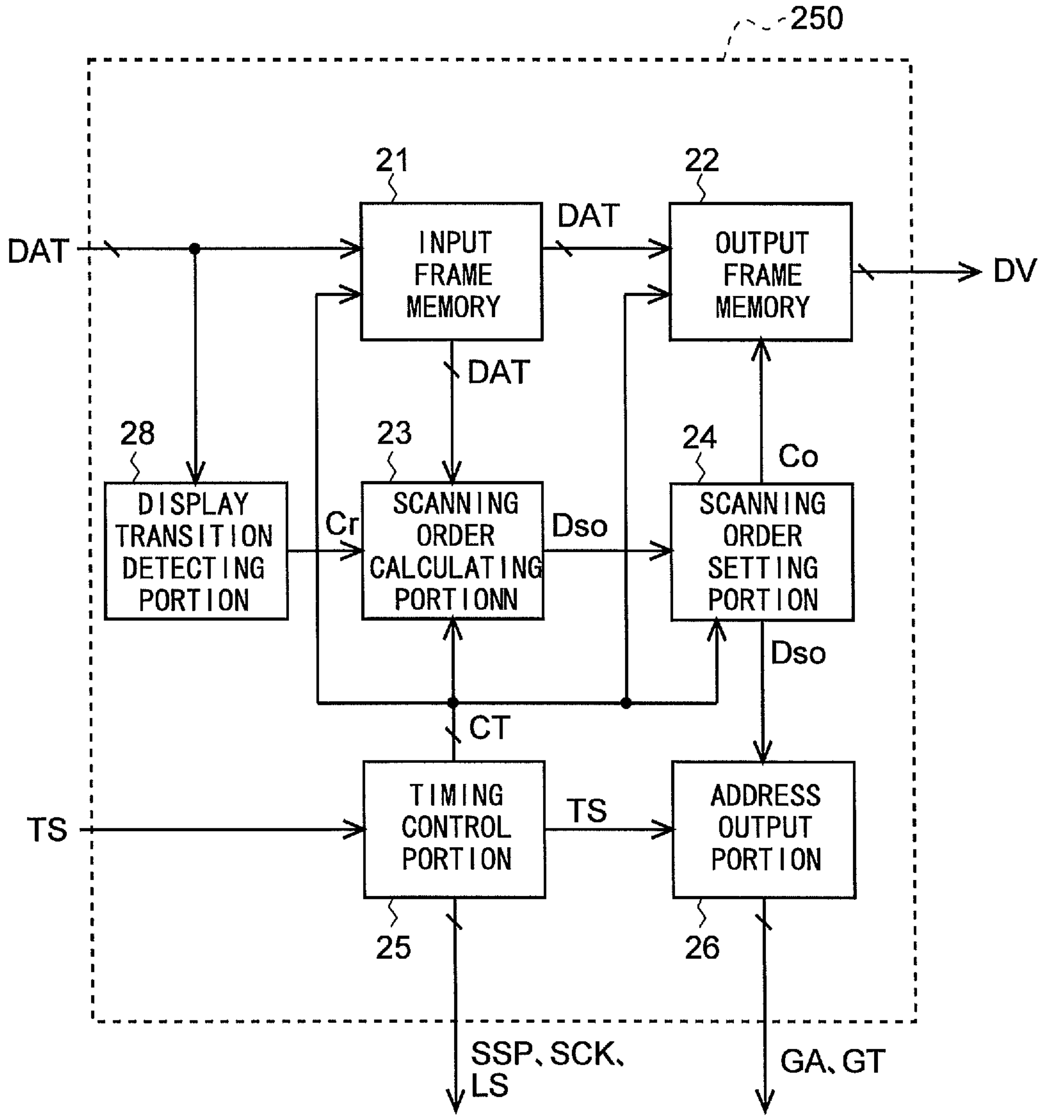
FIG. 20 is a block diagram illustrating the configuration of a display control circuit in a third embodiment of the present invention.

FIG. 20 is a block diagram illustrating the configuration of the display control circuit in the third embodiment of the present invention. As can be appreciated in comparison with the display control circuit 200 shown in FIG. 3, the display control circuit 250 shown in FIG. 20 operates in the same manner and has the same configuration except that a display transition detecting portion 28 is additionally provided, therefore, the same components are denoted by the same characters, any descriptions thereof will be omitted, and only the operation of the additionally provided display transition detecting portion 28 will be described.

<3.2 Operation of the Display Transition Detecting Portion>

The display transition detecting portion 28 shown in FIG. 20 receives an externally provided display data signal DAT, and detects a change in an image represented by the signal. For example, in the case where the same still image such as a wallpaper is being displayed continuously, the order calculated by the scanning order calculating portion 23 to reduce the total amount of change in potential for a plurality of rows with the same display content or for video signal lines would not change. Accordingly, the same computation is performed repeatedly, but this is not preferable from the viewpoint of reducing power consumption. Therefore, the display transition detecting portion 28 monitors the details of images (e.g., integrated values of pixel grayscale values) frame by frame, and if any change in the details is detected, the display transition detecting portion 28 provides an update control signal Cr to the scanning order calculating portion 23.

Upon reception of the update control signal Cr from the display transition detecting portion 28, the scanning order calculating portion 23 calculates the order of selecting all rows (for one frame), as in the first or second embodiment. Operations performed thereafter, for example, in order to select the scanning signal lines, are the same as in the first or second embodiment.

<3.3 Effects>

As described above, in the present embodiment, the scanning order calculating portion 23 calculates the order of selection only upon detection of a change in the image by the display transition detecting portion 28. With this configuration, it is possible to reduce the number of times the scanning order calculating portion 23 performs computation, resulting in reduced power consumption for computation.

<4. Variants of the Embodiments>

All or apart of the functions of the display control circuits in the above embodiments may be included in host controllers or different individual drive control circuits. Alternatively, the functions may be realized by a microcomputer executing corresponding programs.

Furthermore, the above embodiments have been described by taking the active-matrix liquid crystal display device as an example, but the example is not limiting, so long as the display device is of an active-matrix type, and the present invention can be applied similarly to display devices using LEDs (Light Emitting Diodes), such as organic EL (Electro Luminescence) elements, and other flat-panel display devices.

Figure 21:
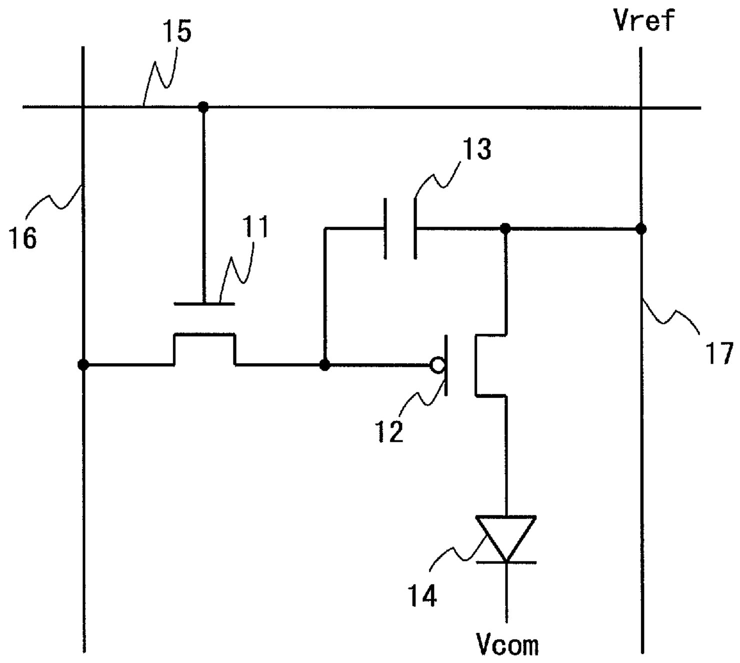
FIG. 21 is a circuit diagram illustrating an equivalent circuit of a pixel forming portion using an organic EL element.

FIG. 21 is a circuit diagram illustrating an equivalent circuit of a pixel forming portion using an organic EL element. This pixel forming portion includes an organic EL element 14, which is an electro-optic element, a power line electrode 17 for supplying a current from a drive power source Vref (an unillustrated current supply portion), a scanning signal line electrode 15 connected to a scanning signal line drive circuit (gate driver circuit), a video signal line electrode 16 connected to a video signal line drive circuit (source driver circuit), a common electrode Vcom, an auxiliary capacitor 13, a current control TFT 12, which is a p-channel TFT for controlling the current to be applied to the organic EL element 14, and a data voltage control TFT 11, which is an n-channel TFT for controlling the timing of applying the current to the organic EL element 14, as shown in FIG. 20. The pixel forming portion is driven by a so-called constant-voltage control method (voltage programming method). More specifically, while the data voltage control TFT 11 is being selected by a scanning signal provided to the scanning signal line electrode 15, a video signal voltage is applied to the video signal line electrode 16, so that a voltage corresponding to the video signal voltage is held in the auxiliary capacitor 13. Thereafter, while the data voltage control TFT 11 is not being selected, the conductivity of the current control TFT 12 is controlled in accordance with the voltage being held in the auxiliary capacitor 13. In this manner, a predetermined current is applied to the organic EL element 14 connected in a series to the current control TFT 12, thereby controlling the amount of light emission from the organic EL element 14. The configurations of the above embodiments can be applied as well to organic EL display devices including such pixel circuits.

INDUSTRIAL APPLICABILITY

The present invention is applied to active-matrix display devices, and is particularly suitable for active-matrix display devices, such as liquid crystal display devices, in which scanning is performed in a different manner from sequential scanning.

DESCRIPTION OF THE REFERENCE CHARACTERS

10 TFT (switching element)
21 input frame memory
22 output frame memory
23 scanning order calculating portion
24 scanning order setting portion
25 timing control portion
26 address output portion
28 display transition detecting portion
200, 250 display control circuit
300 video signal line drive circuit
400, 450 scanning signal line drive circuit
410 address decoder
420 state register
500 display portion
DAT display data signal (image signal)
DV digital image signal
Epix pixel electrode
GL(n) scanning signal line (n=1 to N)
SL(m) data line (m=1 to M)
P(m,n) pixel forming portion (n=1 to N, and m=1 to M)

The invention claimed is:

1. A display device displaying an image by a plurality of pixel forming portions arranged along a plurality of video signal lines that transmit a plurality of video signals and plurality of scanning signal lines crossing the plurality of video signal lines, the display device comprising:

a switching device at each of the plurality of pixel forming portions;

a video signal line drive circuit that drives the plurality of video signal lines based on image signals representing the image;

a scanning order determining circuit that determines an order of selecting the plurality of scanning signal lines based on the image signals to reduce a total amount of change in potential of the plurality of video signal lines, such that at least two of the plurality of scanning signal lines that are equal at each of the plurality of video signal lines in terms of a potential applied to the respective video signal line are selected at a same time; and a scanning signal line drive circuit that selectively drives the plurality of scanning signal lines in the order determined by the scanning order determining circuit, wherein, when an amount of the plurality of scanning signal lines being equal at each of the plurality of video signal lines in terms of the potential applied to the video signal lines exceeds a threshold, the scanning order determining circuit determines the order of selecting the scanning signal lines such that a same amount of the plurality of scanning signal lines as the threshold are selected at a same time.

2. The display device according to claim 1, wherein, when the amount of the plurality of scanning signal lines being equal at each of the plurality of video signal lines in terms of the potential applied to the video signal line exceeds the threshold, the scanning order determining circuit determines the order of selecting the scanning signal lines such that up to a same amount of unselected remaining scanning signal lines of the plurality of scanning signal lines as the threshold are selected at a same time at an immediately succeeding place within the order.

3. A display device displaying an image by a plurality of pixel forming portions arranged along a plurality of video signal lines that transmit a plurality of video signals and a plurality of scanning signal lines crossing the plurality of video signal lines, the display device comprising:

a switching device at each of the plurality of pixel forming portions;

a video signal line drive circuit that drives the plurality of video signal lines based on image signals representing the image;

a scanning order determining circuit that determines an order of selecting the plurality of scanning signal lines based on the image signals to reduce a total amount of charge in potential of the plurality of video signal lines, such that at least two of the plurality of scanning signal lines that are equal at each of the plurality of video signal lines in terms of a potential applied to the respective video signal line are selected at a same time; and a scanning signal line drive circuit that selectively drives the plurality of scanning signal lines in the order determining by the scanning order determining circuit, wherein the scanning order determining circuit determines at least a part of the order so as to minimize an integrated value obtained by adding up absolute values of respective amounts of change in potential for at least a part of the video signal lines due to switching among the scanning signal lines to be selected by the scanning signal line drive circuit.

4. The display device according to claim 3, wherein the scanning order determining circuit determines a next scanning signal line to be selected to minimize the integrated value obtained by adding up the absolute values of the amounts of change in potential, and also determines a scanning signal line to be selected immediately thereafter to minimize the integrated value obtained by adding up the absolute values of the amounts of change in potential.

5. The display device according to claim 3, wherein the scanning order determining circuit calculates the integrated value on the basis of a predetermined number of upper bits of digital grayscale data included in the image signals and specifying potentials to be applied to the video signal lines.

6. The display device according to claim 3, wherein the scanning order determining circuit adds up absolute values of respective amounts of change in potential for every predetermined number of video signal lines from among all of the video signal lines, the predetermined number being an integer multiple of two or more.

7. The display device according to claim 3, wherein, once the order is determined, the scanning order determining circuit keeps the determined order until a change in the image is detected.

8. The display device according to claim 1, wherein, the scanning signal line drive circuit includes an address decoder, and the scanning order determining circuit provides the address decoder with addresses in accordance with the order.

9. The display device according to claim 8, wherein, the scanning signal line drive circuit further includes a state register for receiving a signal outputted by the address decoder and, when a predetermined control signal is active, outputting a signal to select a corresponding scanning signal line, and the scanning order determining circuit provides the control signal to the state register.

10. The display device according to claim 8, wherein, the scanning signal line drive circuit further includes:

a first state register for receiving a signal outputted by the address decoder and, when a predetermined first control signal is active, outputting a signal in accordance with a state of the signal outputted by the address decoder; and a second state register for receiving the signal outputted by the first state register and, when a predetermined second control signal is active, outputting a signal in accordance with a state of the signal outputted by the first state register in order to select a corresponding scanning signal line, and wherein the scanning order determining circuit provides the first control signal to the first state register and the second control signal to the second state register, the second control signal being at least active during a period in which the address decoder is provided with the addresses.

11. The display device according to claim 1, wherein the scanning signal line drive circuit selects the scanning signal lines in the order determined by the scanning order determining circuit, and thereafter stops or pauses its operation for a period until the next image is displayed.

12. The display device according to claim 11, wherein the video signal line drive circuit stops or pauses its operation during the period in which the scanning signal line drive circuit stops or pauses its operation.

13. A method for displaying an image on a plurality of pixel forming portions arranged along a plurality of video signal lines for transmitting a plurality of video signals and a plurality of scanning signal lines crossing the plurality of video signal lines, the method comprising:

driving the plurality of video signal lines on a basis of image signals representing the image;

determining an order of selecting the plurality of scanning signal lines on the basis of the image signals, such that at least two of the plurality of scanning signal lines that are equal at each of the plurality of video signal lines in terms of a potential applied to the respective video signal line are selected at a same time; and selectively driving the plurality of scanning signal lines in accordance with the order determined, wherein when an amount of the plurality of scanning signal lines that are equal at each of the plurality of video signal lines in terms of the potential applied to the video signal lines exceeds a threshold, a scanning order determining circuit determines the order of selecting the plurality of scanning signal lines such that a same amount of the plurality of scanning signal lines as the threshold are selected at a same time, and the scanning order determining circuit determines at least a portion of an order that minimizes a total amount of change in potential obtained by adding up absolute values of respective amounts of change in potential for at least a portion of the plurality of video signal lines due to switching among the plurality of scanning signal lines to be selected by a scanning signal line drive circuit.

* * * * *